US012614099B2

(12) United States Patent
Lucarelli

(10) Patent No.: US 12,614,099 B2
(45) Date of Patent: Apr. 28, 2026

(54) SYSTEM AND METHODS FOR QUANTUM POST-SELECTION USING LOGICAL SYNDROME COMPRESSION

(71) Applicant: Error Corp., Bethesda, MD (US)

(72) Inventor: Dennis Lucarelli, Takoma Park, MD (US)

(73) Assignee: ERROR CORP., Bethesda, MD (US)

( * ) Notice: Subject to any disclaimer, the term of this patent is extended or adjusted under 35 U.S.C. 154(b) by 0 days.

(21) Appl. No.: 18/590,803

(22) Filed: Feb. 28, 2024

(65) Prior Publication Data

US 2024/0289677 A1      Aug. 29, 2024

Related U.S. Application Data

(60) Provisional application No. 63/448,973, filed on Feb. 28, 2023.

(51) Int. Cl.
G06N 10/70 (2022.01)

(52) U.S. Cl.
CPC .................................... G06N 10/70 (2022.01)

(58) Field of Classification Search
CPC ...................................................... G06N 10/70
See application file for complete search history.

(56) References Cited

U.S. PATENT DOCUMENTS

| | | |
|---|---|---|
| 5,768,297 A | 6/1998 | Shor |
| 7,307,275 B2 | 12/2007 | Lidar et al. |
| 8,510,618 B1 | 8/2013 | Pesetski et al. |
| 11,444,636 B2 | 9/2022 | Lucarelli |
| 2004/0000666 A1 | 1/2004 | Lidar et al. |
| 2006/0262925 A1 | 11/2006 | Matsumoto et al. |
| 2014/0365843 A1 | 12/2014 | Ashikhmin |
| 2015/0195087 A1 | 7/2015 | Doi et al. |
| 2016/0112066 A1 | 4/2016 | Ashikhmin |
| 2018/0053112 A1 | 2/2018 | Bravyi et al. |

(Continued)

FOREIGN PATENT DOCUMENTS

| | | |
|---|---|---|
| WO | 2020077303 | 4/2020 |
| WO | 2021025762 | 2/2021 |

OTHER PUBLICATIONS

Bravyi, Sergey and Kitaev, Alexei, "Universal quantum computation with ideal clifford gates and noisy ancillas," Phys. Rev. A, 71:022316, Feb. 2005, 14 pages.

(Continued)

*Primary Examiner* — Joseph D Torres
(74) *Attorney, Agent, or Firm* — Davis Wright Tremaine LLP; Heather M. Colburn

(57) ABSTRACT

Methods, systems, and techniques for detecting errors in qubits within a quantum computing system. In at least one embodiment, at least one quantum check operator is used to couple data qubits with syndrome qubits, a parity-check code is used to couple the syndrome qubits with measure qubits, and the measure qubits are measured to determine whether any errors are present in the data qubits. In at least one embodiment, codewords are coupled to one or more ancilla qubits based at least in part on a binary matrix associated with one or more non-Calderbank-Shor-Steane ("non-CSS") quantum codes, and the one or more ancilla qubits are used to obtain information about any errors present in the codewords.

42 Claims, 12 Drawing Sheets

(56)          References Cited

U.S. PATENT DOCUMENTS

| | | |
|---|---|---|
| 2018/0269906 A1 | 9/2018 | Haah et al. |
| 2020/0119748 A1* | 4/2020 | Lucarelli ................ H03M 13/11 |
| 2020/0175409 A1 | 6/2020 | Kandala |
| 2020/0242208 A1* | 7/2020 | Daraeizadeh ....... G06F 11/1068 |
| 2021/0125096 A1 | 4/2021 | Puri et al. |

OTHER PUBLICATIONS

Campbell, Earl T., and Browne, Dan E., "On the structure of protocols for magic state distillation." In Workshop on Quantum Computation, Communication, and Cryptography, pp. 20-32. Springer, Berlin, Heidelberg, 2009.

Johnson, Sarah J., "Iterative error correction: Turbo, low-density parity-check and repeat-accumulate codes," Cambridge university press, pp. 48-119, 2009.

Knill, Emanuel, "Fault-tolerant postselected quantum computation: Schemes," arXiv preprint quant-ph/0402171, 2004, 17 pages.

Liu, Ye-Hua and Poulin, David, "Neural belief-propagation decoders for quantum error-correcting codes," Physical review letters, 122(20):200501, 2019, 6 pages.

Lugosch, Loren and Gross, Warren J., "Learning from the syndrome," In 2018 52nd Asilomar Conference on Signals, Systems, and Computers, pp. 594-598. IEEE, 2018.

Peterson, Wesley Peterson, and Weldon, EJ "Error-Correcting codes," MIT press, pp. 116-355, 1972.

Reichardt, Ben, "Quantum universality from magic states distillation applied to css codes," Quantum Information Processing, 4(3):251-264, 2005.

Shor, Peter W., "Fault-tolerant quantum computation," In Proceedings of 37th Conference on Foundations of Computer Science, IEEE, 1996, 11 pages.

Steane, Andrew M, "Active stabilization, quantum computation, and quantum state synthesis," Physical Review Letters, 78(11):2252-2255, 1997.

International Search Report and Written Opinion, dated Feb. 3, 2020 received in International Application No. PCT/US2019/055991.

International Search Report and Written Opinion, dated Aug. 5, 2024, received in International Application No. PCT/US24/17758.

Non-Final Office Action, dated May 13, 2025, received in U.S. Appl. No. 18/590,809.

* cited by examiner

110 —

112 —

$$|\psi_1\rangle \quad |\psi_4\rangle \quad |\psi_7\rangle \quad |\psi_{10}\rangle$$

$$|\psi_2\rangle \quad |\psi_5\rangle \quad |\psi_8\rangle \quad |\psi_{11}\rangle$$

$$|\psi_3\rangle \quad |\psi_6\rangle \quad |\psi_9\rangle \quad |\psi_{12}\rangle$$

$$
\begin{matrix}
I & X & I & I \\
I & I & I & I \\
I & I & X & I
\end{matrix}
\qquad
\begin{bmatrix}
0 & 1 & 0 & 0 \\
0 & 0 & 0 & 0 \\
0 & 0 & 1 & 0
\end{bmatrix}
$$

SYSTEM AND METHODS FOR QUANTUM POST-SELECTION USING LOGICAL SYNDROME COMPRESSION

CROSS REFERENCE TO RELATED APPLICATION

This application claims the benefit of U.S. Provisional Patent Application No. 63/448,973, filed on Feb. 28, 2023, which is incorporated herein by reference in its entirety.

GOVERNMENT RIGHTS

This invention was made with Government support under 2213187-SBIR Phase I awarded by the National Science Foundation. The Government has certain rights in the invention.

BACKGROUND OF THE INVENTION

Field of the Invention

The present disclosure relates generally to the field of quantum computing. More specifically, the disclosure relates to systems and methods for quantum error detection, location, and correction; quantum state distillation; quantum state preparation and verification; and quantum post selection.

Description of the Related Art

The field of quantum computing relies on a number of procedures for detecting, locating, and correcting errors that occur in the course of a computation. Quantum states involved in these processes can be generally partitioned into data quantum bits ("qubits") and syndrome qubits. Data qubits store quantum information. Syndrome qubits are measured to non-destructively extract information from the data qubits. Multiple syndrome qubits may be prepared in entangled states and used as "syndrome blocks" for performing fault-tolerant operations.

Quantum error correcting codes encode quantum states in multiple data qubits to create a quantum codeword. Quantum codewords may encode one or more logical qubits. Quantum logic gates are performed on the logical qubits to execute a quantum algorithm. Errors may occur in the data qubits representing the quantum codewords due to faulty quantum logic gates or random errors that occur while the data qubits are idle. To detect and correct errors, the data qubits representing the quantum codewords are coupled to syndrome qubits (or syndrome blocks) that are measured to determine a quantum error syndrome. The quantum error syndrome is then used to infer a location and type of error occurring in the quantum codeword. Qubits may be coupled by performing multiple-qubit logic gates on two or more qubits. Single qubit gates may also be performed on a data qubit or a syndrome qubit. The term "quantum post-selection" is used to describe the inference of quantum information based on measurements of syndrome qubits and any subsequent action taken based on the measurement data. Quantum error correcting codes and syndrome qubits are used in a number of processes needed for quantum computing including quantum memory, quantum error detection and correction, quantum state distillation, entangled syndrome qubit preparation and verification, fault-tolerant encoding, and fault-tolerant measurement.

BRIEF DESCRIPTION OF THE SEVERAL VIEWS OF THE DRAWINGS

The features, objects, and advantages of the invention will become more apparent from the detailed description when considered in connection with the following drawings.

FIG. 2 illustrates a rectangular arrangement of data qubits.

FIG. 3 illustrates a rectangular arrangement of error patterns and a mapping from Pauli-operator errors to binary matrices used by the logical parity decoder.

DETAILED DESCRIPTION OF THE INVENTION

In conventional digital computing, data compression is often used to reduce the size of data by encoding the data with an error correcting code. In particular, a parity-check code can be used to compress a binary data source by computing a set of parity-check conditions on the binary data source to produce a reduced representation of the binary data source called a syndrome. The syndrome representing the binary data source is then stored. Upon retrieval of the syndrome, a reverse process, called decoding, is performed on the syndrome to reconstruct the original binary data source and correct any errors that may have occurred during storage and/or retrieval. The term "source coding" is often used to refer to data compression using error correcting codes. Parity-check codes may also be used for channel coding to send data over a noisy channel. In channel coding, the parity-check code may expand the data by producing a syndrome having a length that is greater than the length of the original binary data source (e.g., a message) and transmitting the message in addition to the syndrome.

Methods and systems for using data compression, channel coding, and linear parity-check codes to detect and locate errors in quantum computing and related processes are described below. The term "error location" is used to describe the process that determines where an error has occurred once an error has been detected. Throughout this disclosure, binary addition and multiplication are performed modulo 2 (e.g., 1+0=1, 0+1=1, 1+1=0, and 0+0=0). The term "classical error correcting code" will be used to refer to an error correcting code designed for binary data source in conventional digital computing. The term "quantum error correcting code" will be used to refer to an error correcting code designed for quantum data in quantum computing.

Figure 1A:
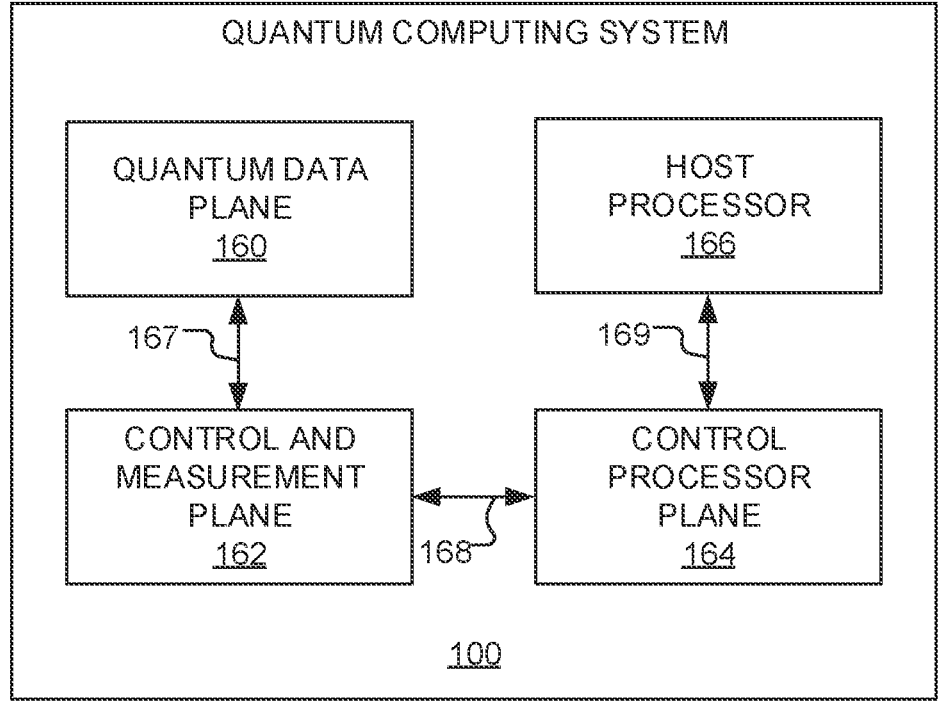
FIG. 1A is a block diagram illustrating an exemplary quantum computing system that may implement a quantum system.
Figure 1B:
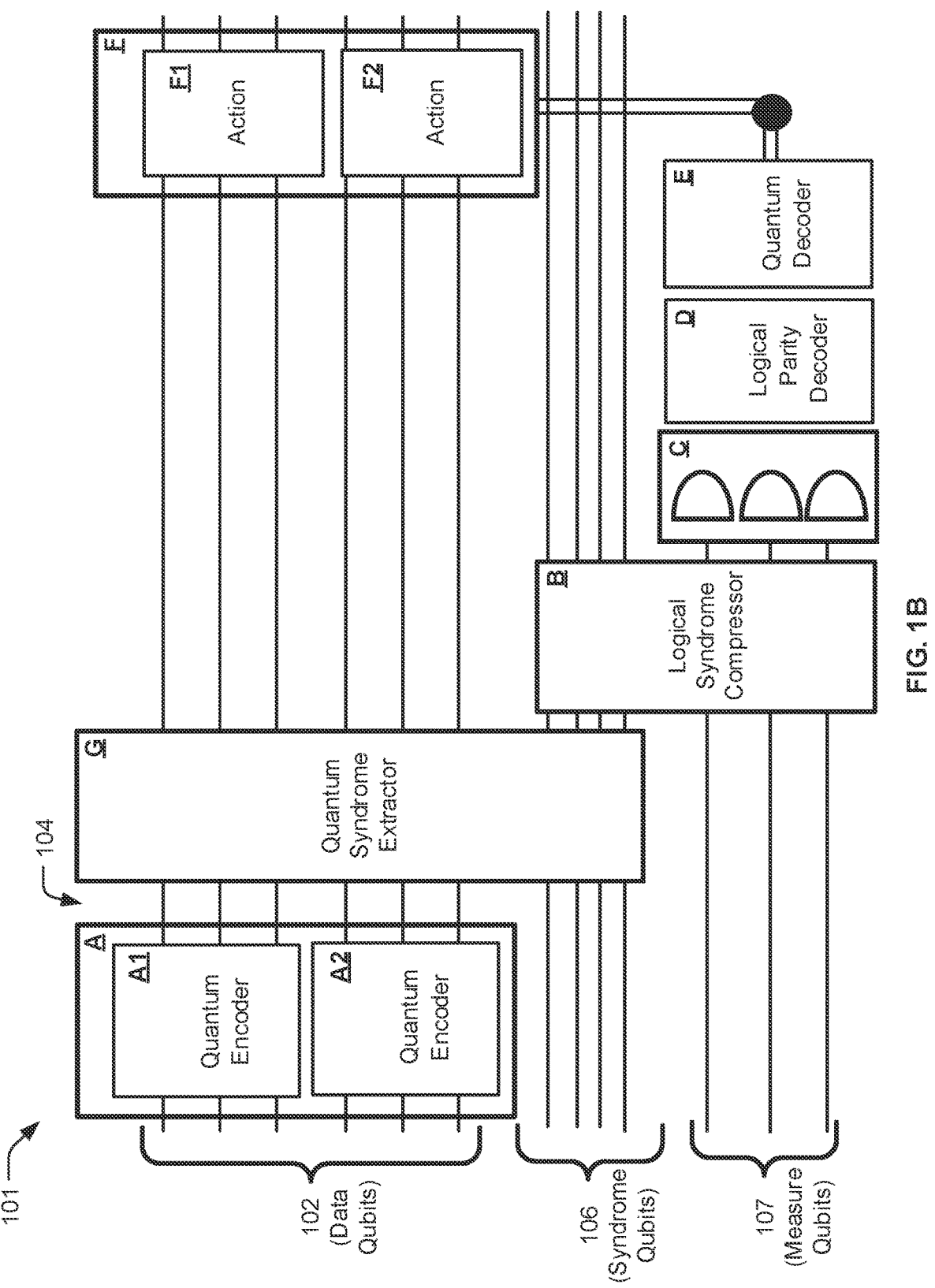
FIG. 1B illustrates a first quantum system that includes a quantum syndrome extractor, a logical syndrome compressor, and a logical parity decoder and may perform quantum encoding, measurement, quantum decoding, post-selection and correction.

FIG. 1A illustrates an example of a quantum computing system 100 and FIG. 1B illustrates a first example quantum system 101 that may be implemented by the quantum computing system 100. The quantum system 101 is configured with a parity-check code and a quantum error correcting code that are used to detect and locate errors in quantum computing and related processes. The quantum computing system 100 is implemented by hardware that may be conceptualized or modeled as including a quantum data plane 160, a control and measurement plane 162, a control processor plane 164, and a host processor 166.

Referring to FIG. 1B, a plurality of data qubits 102, a plurality of syndrome qubits 106, and a plurality of measure qubits 107 reside in the quantum data plane 160 (see FIG. 1A). The quantum data plane 160 provides any circuitry (e.g., a measurement apparatus C) needed to measure states of the qubits and to perform operations on the qubits. For example, referring to FIG. 1A, the quantum data plane 160 may include a programmable "wiring" network commonly referred to as a "quantum circuit") that enables two or more of the qubits to interact. Thus, the quantum data plane 160 may be used to couple selected ones of the data qubits to one or more of the syndrome qubits 106 and/or one or more of the measure qubits 107. The quantum data plane 160 is controlled by the control and measurement plane 162. Thus, a communication link 167 connects the control and measurement plane 162 to the quantum data plane 160.

The control and measurement plane 162 receives signals (e.g., instructions) from the control processor plane 164 indicating which quantum operations the quantum data plane 160 is to perform on the qubits. Thus, a communication link 168 connects the control and measurement plane 162 to the quantum data plane 160. The signals may be digital signals (e.g., encoded in binary) that the control and measurement plane 162 may be converted into analog signals that can be understood and performed by the quantum data plane 160. The control and measurement plane 162 may also convert analog output received from the quantum data plane 160 (via the communication link 168) into digital signals (e.g., encoded in binary) to be transmitted to the control processor plane 164. The analog output may include measurement data obtained for qubits. The control and measurement plane 162 may convert the analog measurement data into binary measurement outcomes and transmit them to the control processor plane 164.

The control processor plane 164 identifies and triggers quantum operations (e.g., gates) and measurements that are performed by the control and measurement plane 162 on the quantum data plane 160. In other words, the control processor plane 164 determines a sequence of quantum operations and measurements required by a particular quantum algorithm and communicates instructions to the control and measurement plane 162 via a communication link 169 that connects the control processor plane 164 to the control and measurement plane 162. The control and measurement plane 162 may execute the instructions received from the control processor plane 164. The instructions may execute a software program (provided by the host processor 166) that implements the particular quantum algorithm.

The host processor 166 provides conventional computing components (e.g., a user interface and memory) to the quantum computing system 100. For example, the host processor 166 may provide software development tools and services used to create the particular quantum algorithm. The host processor 166 may be composed of an integrated circuit, a field programmable gate array, or a conventional computer (e.g., a computing device 12 illustrated in FIG. 9 and described below) that decodes in real time the measurement outcomes and triggers one or more appropriate corrective actions to the control and measurement plane 162 governing the operation of the quantum data plane 160.

Together, the quantum data plane 160 and the control and measurement plane 162 may be characterized as being quantum hardware components and together the control processor plane 164 and the host processor 166 may be characterized as being classical digital hardware components.

Figures 4, 5:
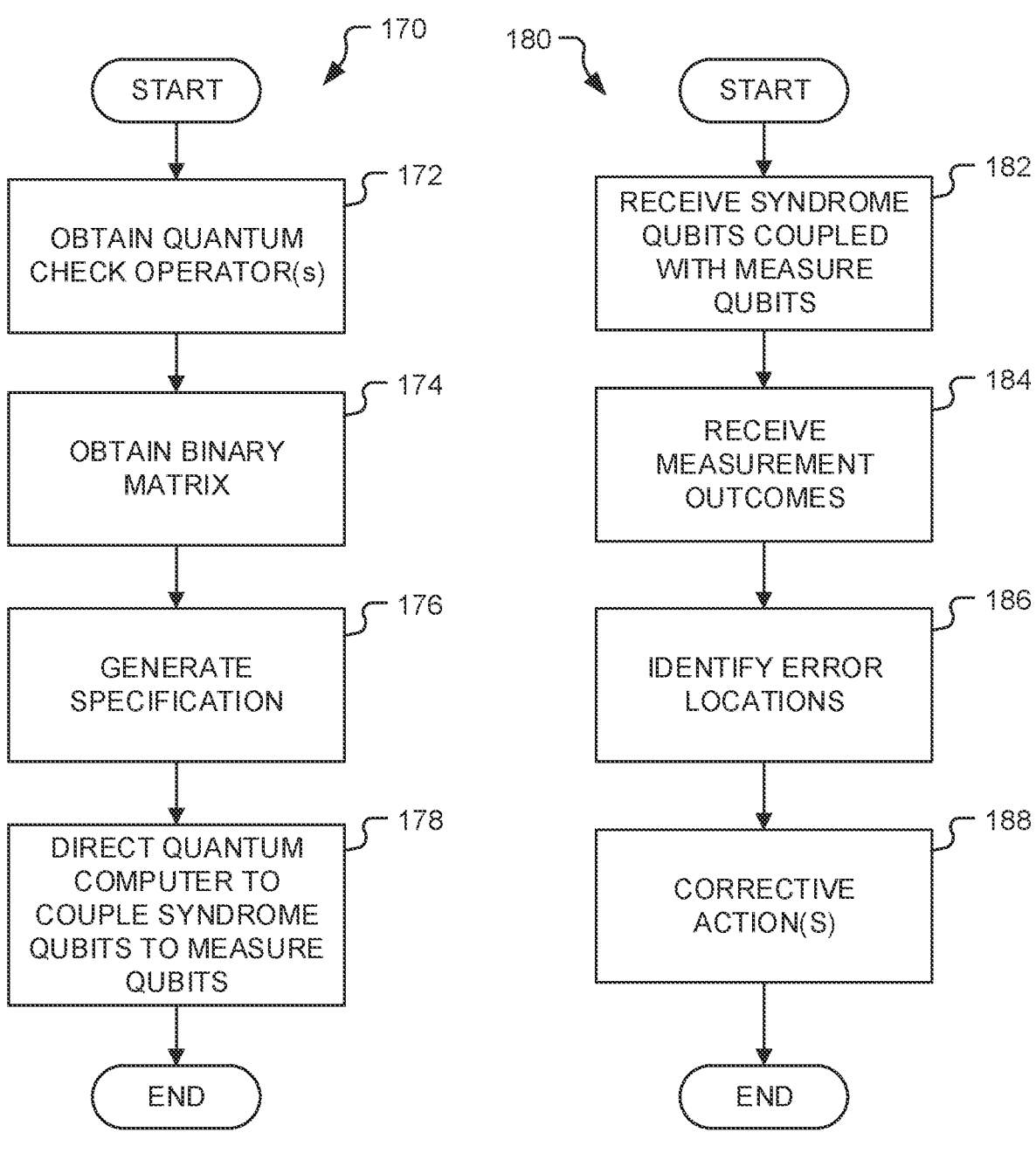
FIG. 4 is a flow diagram of a logical syndrome compressor method that may be performed by the logical syndrome compressor of FIG. 1B.
FIG. 5 is a flow diagram of a logical parity decoding method that may be performed by the logical parity decoder of FIG. 1B.

The quantum computing system 100 may implement a logical syndrome compressor method 170 (see FIG. 4) and a logical parity decoding method 180 (see FIG. 5). In the logical syndrome compressor method 170, each of the measure qubits 107 is coupled to one or more of the syndrome qubits 106 and, accordingly, each of the measure qubits 107 holds (or encodes) error information for several quantum codewords.

Referring to FIG. 1B, the quantum system 101 includes a quantum encoder A, a quantum syndrome extractor G, a logical syndrome compressor B, a measurement apparatus C, a logical parity decoder D, a quantum decoder E, and an action component F. Along with the data qubits 102, the syndrome qubits 106, and the measure qubits 107, the measurement apparatus C resides in the quantum data plane 160 (see FIG. 1A). The quantum encoder A, the quantum syndrome extractor G, the logical syndrome compressor B, the logical parity decoder D, the quantum decoder E, and the action component F may be implemented at least in part by software executing on the host processor 166 (see FIG. 1A). However, these components may communicate with the quantum data plane 160 via the control and measurement plane 162 (see FIG. 1A) and the control processor plane 164 (see FIG. 1A). The quantum encoder A, the quantum syndrome extractor G, the measurement apparatus C, the quantum decoder E, and the action component F may each be implemented using conventional components and may each operate in the usual manner as prescribed by the methods of quantum error correction, quantum state distillation, or quantum state verification.

For ease of illustration, the quantum encoder A has been illustrated as including two portions A1 and A2. However, the quantum encoder A may include any number of portions and the portions A1 and A2 may be implemented as a single quantum encoder. Similarly, the action component F has been illustrated as including two portions F1 and F2. However, the action component F may include any number of portions and the portions F1 and F2 may be implemented as a single action component.

In FIG. 1B, the quantum encoder A receives the plurality of data qubits 102 and produces a plurality of quantum codewords 104 (illustrated as lines or "wires" output by the quantum encoder A). In the embodiment illustrated, the portion A1 of the quantum encoder A encodes a first portion of the data qubits 102 into a first portion of the quantum codewords 104 using a quantum code. Similarly, the portion A2 of the quantum encoder encodes a second portion of the data qubits 102 into a second portion of the quantum codewords 104 using the quantum code. The plurality of quantum codewords 104 are used to carry the quantum information.

To execute a quantum algorithm, quantum logic gates (not shown in FIG. 1B) are performed on the logical qubits contained in the quantum codewords 104 by the quantum data plane 160 (see FIG. 1A). Errors that occur during the execution of quantum logic gates on the quantum codewords 104 or when the quantum codewords 104 are idle may be detected, located, and corrected by an error correcting procedure.

After one or more logic gates are performed on the logical qubits (e.g., during the quantum algorithm), the quantum syndrome extractor G couples the quantum codewords 104 to the syndrome qubits 106. Thus, after the quantum encoder A produces the quantum codewords 104, the quantum logic gates of the quantum algorithm are performed on the logical qubits contained in the quantum codewords 104 to produce processed quantum codewords. After the quantum logic gate(s), the quantum syndrome extractor G couples the quantum codewords 104 to the syndrome qubits 106.

Next, the logical syndrome compressor B performs the logical syndrome compressor method 170 (see FIG. 4), which couples each of the syndrome qubits 106 to one or more of the measure qubits 107. Then, the measure qubits 107 are measured by the measurement apparatus C to obtain measurement data. After measurement, the measure qubits 107 are reset to their initial states, which may be the "0" or ground state. The logical syndrome compressor method 170 (see FIG. 4) may be performed one or more additional times with the measure qubits being reset between each successive performance of the logical syndrome compressor method 170. After performance of the logical syndrome compressor method 170 has completed, the syndrome qubits 106 may be reset to their initial states. In other words, the syndrome qubits 106 may be repeatedly coupled to reset measure qubits and measurement data obtained. Referring to FIG. 1A, the control and measurement plane 162 and the control processor plane 164 communicate the measurement data to the host processor 166 as binary valued measurement outcomes. Referring to FIG. 1B, the resulting set of binary valued measurement outcomes (referred to as a "logical parity syndrome" in the following) and a binary matrix (e.g., a parity-check matrix, a sub-parity-check matrix, a parity-check matrix pre-multiplied by a generator matrix, and/or the like) associated with a classical error correcting code are sent to the logical parity decoder D. Then, the logical parity decoder D performs a logical parity decoding method 180 (see FIG. 5) that uses the measurement outcomes to infer where errors (if any) occurred in the quantum codewords 104.

In FIG. 1B, the logical syndrome compressor B is performed after the quantum syndrome extractor G. In some embodiments, the logical syndrome compressor B may be performed before the quantum syndrome extractor G. In such embodiments, the syndrome qubits 106 and the measure qubits 107 are prepared in an entangled state prior to syndrome extraction by the quantum syndrome extractor G. For example, after one or more logic gates are performed on the logical qubits (e.g., during the quantum algorithm), the logical syndrome compressor B may perform the logical syndrome compressor method 170 (see FIG. 4), which couples each of the syndrome qubits 106 to one or more of the measure qubits 107. Then, the quantum syndrome extractor G may couple the quantum codewords 104 to the syndrome qubits 106. Next, the measurement apparatus C measures the measure qubits 107 to obtain measurement data. After measurement, the measure qubits 107 are reset to their initial states, which may be the "0" or ground state. Then, as mentioned above, the logical syndrome compressor B may repeat the logical syndrome compressor method 170 (see FIG. 4) one or more additional times with the measure qubits being reset between each successive performance of the logical syndrome compressor method 170. After performance of the logical syndrome compressor method 170 has completed, the syndrome qubits 106 may be reset to their initial states. In other words, the syndrome qubits 106 may be repeatedly coupled to reset measure qubits and measurement data obtained. Referring to FIG. 1A, the control and measurement plane 162 and the control processor plane 164 may communicate the measurement data to the host processor 166 as one or more logical parity syndrome. A binary matrix (e.g., a parity-check matrix, a sub-parity-check matrix, a parity-check matrix pre-multiplied by a generator matrix, and/or the like) associated with a classical error correcting code is sent to the logical parity decoder D. Then, the logical parity decoder D and the quantum decoder E may function as described herein.

Some quantum post-selection tasks, including quantum error correction and quantum state distillation as non-limiting examples, may require measuring multiple quantum check operators to calculate the measurement outcomes used by the logical parity decoder D. Thus, the quantum syndrome extractor G, the logical syndrome compressor B, the measurement apparatus C, and the logical parity decoder D may be configured to construct a "full logical parity syndrome" by measuring multiple quantum check operators in a sequential or parallel configuration. Using the full logical parity syndrome, the logical parity decoder D may complete the identification of error types and locations. Non-limiting examples of error types include bit-flips (e.g., Pauli-X type errors) and phase flips (e.g., Pauli-Z type errors).

Some quantum error correcting codes may require additional processing to disambiguate complex error patterns. In these cases, the quantum error syndrome associated with the chosen quantum error correcting code may be computed from the full logical parity syndrome and passed to the quantum decoder E, which operates in the usual manner, to identify the error types and any of the data qubits containing errors. The error types and error locations produced by the logical parity decoder D and/or the quantum decoder E are then passed to the action component F, which applies one or more corrective actions to any of the data qubits 102 with errors to thereby restore the data qubits 102 to their correct original state prior to the error(s) having occurred. By restoring the data qubits 102 to their correct and original states existing prior to the error(s) having occurred, the quantum codewords 104 are also restored to their states prior to the error(s) having occurred.

The arrangement of data qubits into quantum codewords generally depends on the quantum error correcting code and the qubit device (in the quantum data plane 160 illustrated in FIG. 1A) used in operation. The logical syndrome compressor B and the logical parity decoder D are compatible with an arbitrary arrangement of data qubits into quantum codewords. In other words, the logical syndrome compressor B and the logical parity decoder D both function or may be configured to function with any arrangement of the data qubits 102 into the quantum codewords 104.

Referring to FIG. 2, the logical syndrome compressor B may conceptually arrange the data qubits 102 (see FIG. 1B) in a rectangular array 110. In the example illustrated in FIG. 2, the rectangular array 110 includes twelve data qubits, illustrated as values $|\psi_j\rangle$ for j=1, . . . , 12, arranged in three rows and four columns. Each of the columns may represent a different quantum codeword (e.g., a codeword 112).

Referring to FIG. 1B, the logical parity decoder D infers error patterns acting on the data qubits 102 that may include Pauli-X errors (quantum bit-flips) and Pauli-Z errors (quantum phase flips) as non-limiting examples. An error pattern acting on the data qubits 102 may be represented by an array containing identity operators and error operators with dimensions matching the rectangular representation (e.g., the rectangular array 110 illustrated in FIG. 2) of the data qubits 102. As a non-limiting example, FIG. 3 illustrates Pauli-X errors acting on the data qubits $|\psi_4\rangle$ and $|\psi_9\rangle$. The logical parity decoder D may represent the error pattern by a rectangular array 114 that includes X operators (each identified by the letter "X") and identity operators (each identified by the letter "I"). In the rectangular array 114, the letter "X" indicates a Pauli-X error has occurred on corresponding data qubit. On the other hand, the letter "I" indicates an identify operator and that no error has occurred on corresponding data qubit. Thus, FIG. 3 illustrates the letter "X" in positions corresponding to the data qubits $|\psi_4\rangle$ and $|\psi_9\rangle$ that have Pauli-X errors. Alternatively, the error pattern may also be represented by a binary rectangular array 116 with dimensions matching those of the rectangular array 110. In the binary rectangular array 116, an entry with a value of "1" indicates an error occurred on the corresponding data qubit and an entry with a value of "0" indicates that no error has occurred on the corresponding data qubit.

Logical Syndrome Compressor Method

FIG. 4 is a flow diagram of the logical syndrome compressor method 170 that may be performed by the logical syndrome compressor B (see FIG. 1B). The logical syndrome compressor method 170 may couple each of the syndrome qubits 106 (see FIG. 1B) to one or more of the measure qubits 107 (see FIG. 1B) according to a binary matrix associated with a classical error correcting code. "Syndrome compression" performed by the logical syndrome compressor method 170 occurs in the quantum plane as opposed to the classical plane.

In first block 172, the logical syndrome compressor B obtains one or more quantum check operators (represented by a variable S). Referring to FIG. 1B, the logical syndrome compressor B and the logical parity decoder D may be configured to operate with a variety of quantum error detecting and quantum error correcting codes, including as non-limiting examples, the Calderbank-Shor-Steane ("CSS") codes, non-CSS codes, quantum erasure codes, topological codes, surface codes, quantum Bose-Chaudhuri-Hocquenghem codes, quantum low-density parity-check ("LDPC") codes, the Bacon-Shor code, the Steane code, and/or the three-qubit bit-flip code. The chosen quantum error detecting or quantum error correcting code is implemented by the quantum encoder A and specifies a set of quantum check operators that the quantum syndrome extractor G may use to couple the data qubits 102 to the syndrome qubits 106.

The term "quantum check operator" is used to specify how the data qubits 102 are coupled to the syndrome qubits 106 for a single quantum codeword or multiple-qubit entangled state. The quantum check operator used by the quantum encoder A depends on the chosen error type and post-selection task. By way of non-limiting examples, quantum check operators compatible with the logical syndrome compressor B and the logical parity decoder D include (1) a quantum stabilizer operator associated with a quantum error correcting code that may be used to determine error type and/or error location, (2) a quantum stabilizer operator that may be used for state-distillation and (3) a state verification circuit that may be used for entangled state preparation and verification.

The quantum check operator(s) may be expressed as a vector, an array, a matrix, and/or the like. Further, the quantum check operator(s) may be expressed as a binary vector, binary array, binary matrix, and/or the like, that include entries each having a value selected from a set of two values (e.g., one or zero). The quantum check operator(s) may be based at least in part on at least one multiple-qubit Pauli operator. For example, the value "X" may be used to denote a Pauli-X operator (bit-flip error) and the value "Z" may be used to denote a Pauli-Z operator (phase-flip error). In such embodiments, the variable S may store a binary matrix created by associating the value "1" with a Pauli operator and the value "0" with the identity operator. As a non-limiting example, if the quantum check operator is "ZIZ," the variable S may store a binary vector [1 0 1].

Next, in block 174, the logical syndrome compressor B obtains a binary matrix (represented by a variable H). The binary matrix is based at least in part on a classical error correcting code. By way of non-limiting examples, the classical error correcting code may be a parameter set by the user or selected by the logical syndrome compressor B.

The binary matrix may be based at least in part on a classical error correcting code that uses an array of N bits to encode an array of K message bits, using M=N−K redundancy (or parity) bits. An error correcting code capable of correcting a number "t" of errors is denoted as [N,K,t]. Referring to FIG. 1B, when the logical syndrome compressor B and the logical parity decoder D are configured with a [N,K,t] classical error correcting code, they may detect and locate at least the number "t" errors occurring in the data qubits 102.

The binary matrix (represented by the variable H) may be implemented as a binary parity-check matrix, denoted $H_L$. A parity-check code may be specified by an M×N dimensional binary parity-check matrix, denoted $H_L$. Parity-check codes and associated decoding algorithms are well known to those of ordinary skill in the art and will not be described in detail. However, by way of non-limiting examples, Hamming codes, Reed-Muller codes, Bose-Chaudhuri-Hocquenghem ("BCH") codes, low-density parity-check ("LDPC") codes, Polar Codes and one or more of the codes described in references [1] and [2] below may be used by the logical syndrome compressor B and the logical parity decoder D.

Then, in block 176, the logical syndrome compressor B generates a specification from the binary matrix (represented by the variable H) and an identity matrix (represented by a variable Id). The specification indicates which of the syndrome qubits 106 (see FIG. 1B) are to be coupled to which of the measure qubits 107 (see FIG. 1B). The specification may be based at least in part on a resultant matrix (represented by a variable $R_M$) that is a matrix Kronecker product (represented by a symbol "$\otimes$") of the binary matrix and the identity matrix (e.g., a square matrix with 1's along the diagonal and 0's elsewhere) of appropriate dimension. Thus, the specification may be generated in accordance with Equation 1 below:

$$R_M = H \otimes Id \qquad \text{Equation 1}$$

In the following example, the binary matrix has been implemented as the parity-check matrix $H_L$, which is a binary parity-check matrix associated with a classical error correcting code. Referring to FIG. 1B, the logical syndrome compressor B may be configured to couple the syndrome qubits 106 to the measure qubits 107 according to the resultant matrix $R_M$ formed by the Kronecker product of the parity-check matrix $H_L$ and the identity matrix Id as expressed in the Equation 2 (below):

$$R_M = H_L \otimes Id = \begin{bmatrix} h_{11}Id & h_{12}Id & \dots & h_{1N}Id \\ h_{21}Id & h_{22}Id & \dots & h_{2N}Id \\ \vdots & \vdots & \vdots & \vdots \\ h_{M1}Id & h_{M2}Id & \dots & h_{MN}Id \end{bmatrix} \qquad \text{Equation 2}$$

In Equation 2, each of the variables $h_{ij}$ is a binary number located in the i-th row and j-th column of the parity-check matrix $H_L$. As mentioned above, in Equation 2 and throughout this disclosure, binary addition and multiplication are performed modulo 2 (e.g., 1+0=1, 0+1=1, 1+1=0 and 0+0=0). As mentioned above, the parity-check matrix $H_L$ has dimensions M×N. The identity matrix represented by the variable Id has dimensions R×R, where the variable R is the number of check operators used by the quantum syndrome extractor G (see FIG. 1B). The resultant matrix $R_M$ (or matrix Kronecker product $H_L \otimes Id$) is referred to as a "logical syndrome compression matrix," and has M multiplied by R (M·R) rows and N multiplied by R (N·R) columns.

Referring to FIG. 1A, as explained above, the logical syndrome compressor B is executed by the host processor 166. Instructions issued by the logical syndrome compressor B executing on the host processor 166 are passed to the control processor plane 164, which identifies and triggers quantum operations (e.g., gates) and measurements to be performed by the control and measurement plane 162 on the quantum data plane 160. In this manner, the logical syndrome compressor B constructs the quantum circuit for execution on the quantum computing system 100 (see FIG. 1A).

For example, the logical syndrome compressor B (see FIG. 1B) may construct the quantum circuit from the resultant matrix $R_M$ by coupling a number N·R (which is the number of columns of the resultant matrix $R_M$) of the syndrome qubits 106 to a number M·R (which is the number of rows of the resultant matrix $R_M$) of the measure qubits 107 as follows. A multiple-qubit gate, which may include a controlled-NOT gate ("CNOT gate") or a controlled-PHASE gate ("CPHASE gate") as non-limiting examples, couples syndrome qubit "j" to measure qubit "i" if, and only if, the binary number located in the i-th row and j-th column of the logical syndrome compression matrix $R_M$ is "1." On the other hand, if the binary number located in the i-th row and j-th column of the logical syndrome compression matrix $R_M$ is "0," the syndrome qubit "j" remains uncoupled from the measure qubit "i".

In block 178 of FIG. 4, the logical syndrome compressor B (see FIG. 1B) directs the quantum hardware components to couple each of selected ones of the syndrome qubits 106 (see FIG. 1B) to one or more of the measure qubits 107 (see FIG. 1B) in accordance with the couplings indicated in the specification. The syndrome qubits 106 may be coupled to the measure qubits 107 by performing quantum logic gates (e.g., multiple-qubit logic gates and/or single qubit gates) on the syndrome qubits 106 and the measure qubits 107. Qubits may be coupled by performing multiple-qubit logic gates on two or more qubits. A single qubit gate may be performed on a data qubit, syndrome qubit, or a measure qubit.

Then, the logical syndrome compressor method 170 terminates.

For quantum post-selection applications requiring measurement from multiple quantum check operators, including quantum error correction and quantum state distillation as non-limiting examples, a logical parity configuration matrix may be formed by the Kronecker product of the parity-check matrix $H_L$ and a matrix, denoted $H_Q$. The matrix $H_Q$ may be constructed by arranging binary representation(s) of the quantum check operator(s) used by the quantum syndrome extractor G in rows. In the case of the number "R" of quantum check operators ($S_1, S_2, \dots, S_R$), a resultant matrix $T_M$ (the logical parity configuration matrix) may be expressed as the Kronecker product of the parity-check matrix $H_L$ and the binary matrix $H_Q$ formed by arranging the check operators ($S_1, S_2, \dots, S_R$), as rows. This relationship is depicted in Equation 3 below:

$$T_M = H_L \otimes H_Q = H_L \otimes \begin{bmatrix} - & S_1 & - \\ - & S_2 & - \\ \vdots & \vdots & \vdots \\ - & S_R & - \end{bmatrix} \qquad \text{Equation 3}$$

In some embodiments, the logical syndrome compression matrix (e.g., the resultant matrix $R_M$) may have a different form from that specified by Equations. 1 and 2. In at least one embodiment, the logical syndrome compression matrix may be constructed from a binary matrix that may correspond to the parity-check matrix $H_L$ of a classical error correcting code. For example, the logical syndrome compression matrix may be an appropriately sized version of the parity-check matrix $H_L$. As mentioned herein, the logical syndrome compression matrix may have a number of rows that may be calculated by multiplying M by the value of the variable R (M·R) and a number of columns calculated by multiplying N by the value of the variable R (N·R). As mentioned herein, the variable R is the number of check operators used by the quantum syndrome extractor G (see FIG. 1B). In such embodiments, the logical syndrome compression matrix may be the parity-check matrix $H_L$ of the classical error correcting code with M·R rows and N·R columns. When the quantum measurement apparatus C (see FIG. 1B) measures the measure qubits 107 to produce a logical parity syndrome, that logical parity syndrome will be different from the logical parity syndrome obtained when the logical syndrome compression matrix is determined using Equations. 1 and 2.

Logical Parity Decoding Method

FIG. 5 is a flow diagram of the logical parity decoding method 180 that may be performed at least in part by the logical parity decoder D (see FIG. 1B) when the logical parity decoder D is operating with the logical syndrome compressor B. In at least one embodiment, the quantum syndrome extractor G and/or the measurement apparatus C may be performed between the logical syndrome compressor B and the logical parity decoder D. The logical parity decoding method 180 uses measurement outcomes obtained (by the measurement apparatus C illustrated in FIG. 1B) from the measure qubits 107 (see FIG. 1B) to infer where errors (if any) occurred in the quantum codewords 104 (see FIG. 1B).

In first block 182, the logical parity decoder D (see FIG. 1B) receives the measure qubits 107 (see FIG. 1B) coupled with the syndrome qubits 106 (see FIG. 1B) by the logical syndrome compressor method 170 (see FIG. 4). As explained above, the logical syndrome compressor method 170 couples selected ones of the syndrome qubits 106 to one or more of the measure qubits 107. The logical parity decoder D may optionally provide the measure qubits to the measurement apparatus C (see FIG. 1B) for measurement thereby. Alternatively, the measure qubits may be routed to the measurement apparatus C (e.g., by the logical syndrome compressor B).

Then, in block 184, the logical parity decoder D (see FIG. 1B) receives measurement outcomes (e.g., an array of measurement outcomes) from the measurement apparatus C (see FIG. 1B). As described above, the measurement apparatus C generates measurement data by measuring the measure qubits 107. The measurement apparatus C may communicate the measurement outcomes to the host processor 166 (see FIG. 1A), which may implement at least a portion of the logical parity decoder D.

Next, in block 186, the logical parity decoder D (see FIG. 1B) uses configuration data and the measurement outcomes to identify locations of any errors present in the data qubits 102. The configuration data includes the quantum check operator(s) and the binary matrix that was used by the logical syndrome compressor B (see FIG. 1B) to generate the specification, which specified which of the syndrome qubits were coupled to which of the measure qubits.

In block 188, the logical parity decoder D (see FIG. 1B) sends signals (e.g., including the error location(s) identified in block 186) to control hardware instructing the control hardware to perform one or more corrective actions on the data qubit(s) that include the error(s). The control hardware may include the hardware on the control and measurement plane 162 (see FIG. 1A). By way of non-limiting examples, the control hardware performs the corrective action(s) by using a quantum logic gate to change the state or discarding the state of a data qubit with an error. By way of non-limiting examples, the control hardware may include the action component F (see FIG. 1B).

The methods 170 and 180 are typically performed after quantum logic gates have been applied to the logical qubits and/or the data qubits in accordance with a quantum algorithm. The quantum algorithm, which is executed by the quantum computing system 100 (see FIG. 1A), is performed using the data qubits. Block 188 may be performed before or after execution of the quantum algorithm completes. When block 188 is performed after execution of the quantum algorithm completes, the logical parity decoder D (see FIG. 1B) waits until execution of the quantum algorithm completes to send the signals to the control hardware. Then, the logical parity decoding method 180 terminates.

In alternate embodiments, in block 186, the logical parity decoder D (see FIG. 1B) uses the configuration data and the measurement outcomes to obtain the quantum error syndrome. In such embodiments, the logical parity decoder D passes the quantum error syndrome to the quantum decoder E, which identifies the error location(s). The quantum decoder E may send the error location(s) to the logical parity decoder D, which may then perform block 188. Alternatively, the quantum decoder E may send signals to the control hardware instructing the control hardware to perform the corrective action(s) on the data qubits.

Portions of the logical syndrome compressor method 170 and the logical parity decoding method 180 may be repeated for different sets of quantum check operator(s). For example, the quantum error correcting code may specify two distinct sets of quantum check operator(s), where each set is used to detect a different error type. For example, a quantum error correcting code may specify one or more quantum check operator(s) for detecting Pauli-X type errors and a distinct set of one or more quantum check operator(s) for detecting Pauli-Z type errors. In such embodiments, the logical syndrome compressor B and the logical parity decoder D locate errors in the manner described previously by constructing distinct full logical parity syndromes, each corresponding to a specific error type.

For example, the logical syndrome compressor method 170 and the logical parity decoding method 180 may be performed for quantum check operator(s) for detecting Pauli-X type errors and quantum check operator(s) for detecting Pauli-Z type errors. For ease of illustration, the methods 170 and 180 will be described as being performed for the quantum check operator(s) for detecting Pauli-X type errors before being performed for the quantum check operator(s) for detecting Pauli-Z type errors. However, this order may be reversed, and the methods 170 and 180 may be performed for the quantum check operator(s) for detecting Pauli-Z type errors before being performed for the quantum check operator(s) for detecting Pauli-X type errors.

In this example, the logical syndrome compressor method 170 and the logical parity decoding method 180 are performed for the quantum check operator(s) for detecting Pauli-X type errors. Block 176 (see FIG. 4) is performed for the quantum check operator(s) for detecting Pauli-Z type errors to obtain a second specification. The second specification is generated using the binary matrix and the quantum check operator(s) for detecting Pauli-Z type errors. Then, block 178 (see FIG. 4) is performed for the second specification. Next, in block 182 (see FIG. 5), the logical parity decoder D (see FIG. 1B) receives the syndrome qubits 106 (see FIG. 1B) coupled with the measure qubits 107 (see FIG. 1B) in accordance with the second specification. Then, in block 184, the logical parity decoder D (see FIG. 1B) receives new measurement outcomes from the measurement apparatus C (see FIG. 1B) for the measure qubits coupled in accordance with the second specification. In block 186, the logical parity decoder D (see FIG. 1B) uses the binary matrix (e.g., the logical parity configuration matrix), the quantum check operator(s) for detecting Pauli-Z type errors, and the new measurement outcomes to identify new locations of any errors present in the data qubits 102. In block 188, the logical parity decoder D (see FIG. 1B) sends new signals to the control hardware (e.g., including the error location(s) and) instructing the control hardware to perform one or more new corrective actions on the data qubit(s) that include the error(s).

Some quantum codes, e.g., non-CSS quantum codes (which may include the 5-qubit code and the XZZX surface code) as non-limiting examples, do not separate the error location tasks into separate rounds of syndrome extraction for Pauli-X and Pauli-Z errors, and instead identify both Pauli-X and Pauli-Z errors and their locations from the same set of measurement outcomes. In embodiments using such quantum codes, the quantum check operators are composed of both Pauli-X and Pauli-Z operators (e.g., the 5-qubit code check operator ZXIXZ) and the matrix $H_Q$ may be constructed by arranging binary representation(s) of the quantum check operator(s) used by the quantum syndrome extractor G in rows partitioned into separate blocks for the Pauli-X operators and Pauli-Z operators. For example, the 5-qubit code check operator ZIXIXZ may be expressed as the binary vector [001010|10001]. In such embodiments, the matrix $H_Q$ may be composed of a submatrix $H_X$ specifying the Pauli-X operators in the check operator and a submatrix $H_Z$ specifying the Pauli-Z operators in the check operator. This relationship may be expressed using Equation 4 below:

$$H_Q = [H_X \mid H_Z] \qquad \text{Equation 4}$$

Further, the specification for the logical syndrome compressor method 170 may be generated in accordance with Equation 5 below:

$$R_M = H_L \otimes Id = \begin{bmatrix} h_{11}Id & h_{12}Id & \dots & h_{1N}Id \\ h_{21}Id & h_{22}Id & \dots & h_{2N}Id \\ \vdots & \vdots & \vdots & \vdots \\ h_{M1}Id & h_{M2}Id & \dots & h_{MN}Id \end{bmatrix} \qquad \text{Equation 5}$$

Additionally, the logical parity configuration matrix (e.g., the resultant matrix $T_M$) may be generated in accordance with Equation 6 below:

$$T_M = [H_L \otimes H_X \mid H_L \otimes H_Z] \qquad \text{Equation 6}$$

The logical parity decoder D may be implemented by a neural belief decoder using one or more of the methods described in references [3] and [4]. The neural belief decoder may be constructed using measurement outcomes and the configuration data that may include the logical parity configuration matrices $H_L \otimes S$ for all of the quantum check operators ($S_1$, $S_2$, . . . , $S_R$).

To help ensure fault tolerance, where errors present in the ancilla qubits only propagate to a single data qubit during measurement of a quantum check operator, each syndrome qubit may be replaced by a block of syndrome qubits prepared in an entangled state and measured by one or more of the methods described in references [5, 6, 7]. The logical syndrome compressor B (see FIG. 1) and the logical parity decoder D (see FIG. 1) may be configured to use multiple-qubit syndrome blocks to implement fault-tolerant syndrome extraction. In this configuration, each syndrome qubit (denoted by a single line or "wire" in FIG. 1B) is replaced with a syndrome block using multiple qubits that may be prepared in an entangled state, as described in references [5, 6, 7] as non-limiting examples. To help ensure fault-tolerance, the quantum syndrome extractor G may couple the data qubits to the multiple-qubit syndrome block according to the quantum check operator so that each data qubit is coupled to a single syndrome qubit in the syndrome block. Next, the logical syndrome compressor B may construct a quantum circuit by coupling the measure qubits to the syndrome qubit blocks according to the logical syndrome compression matrix $H_L \otimes Id$ constructed from the parity-check matrix $H_L$ and the identity matrix Id (see Equation 2). In this configuration, the logical syndrome compressor B, couples each of the syndrome qubits comprising the j-th syndrome block to the i-th measure qubit 107 (see FIG. 1), if and only if, the number in the i-th row and j-th column of the logical syndrome compression matrix $H_L \otimes Id$ has the value "1." The coupling of a measure qubit to a syndrome qubit in the syndrome block may be implemented by performing a separate multiple-qubit gate, including the CNOT or CPHASE gate as non-limiting examples.

Figure 6:
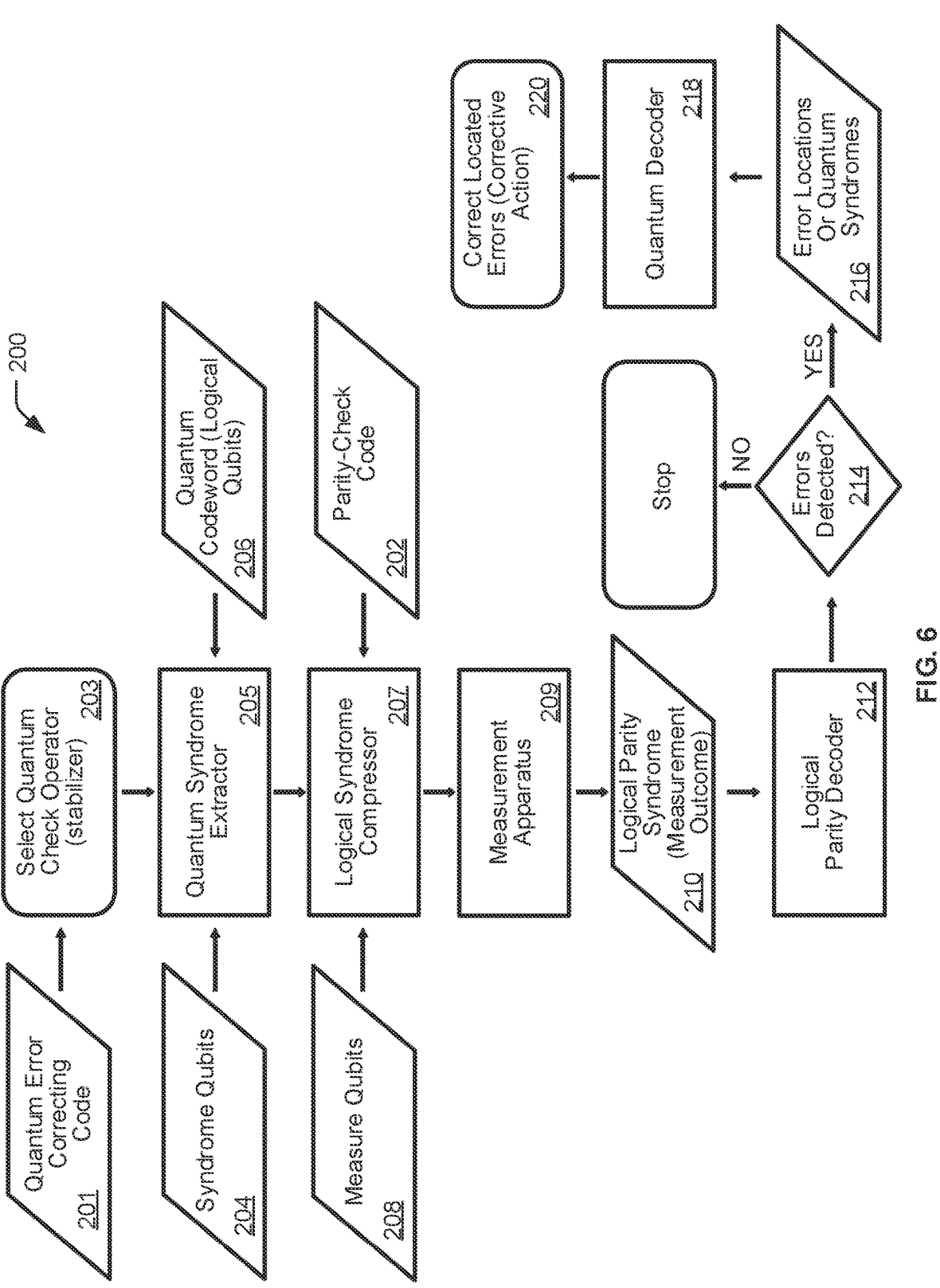
FIG. 6 Illustrates a process diagram of a method of performing quantum error detection, location, and correction that is performed at least in part by the quantum syndrome extractor, the logical syndrome compressor, and the logical parity decoder of FIG. 1B.

FIG. 6 illustrates a process diagram of a method 200 performed at least in part by the quantum syndrome extractor G (see FIG. 1B), the logical syndrome compressor B (see FIG. 1B), and the logical parity decoder D (see FIG. 1B). The method 200 may be used to perform quantum error detection, location, and correction as described in detail in the previous paragraphs. Prior to operation, one or more of the component(s) performing the method 200 may receive as input a quantum error correcting code 201 and/or a parity-check code 202. The quantum error correcting code 201 may be chosen for a particular application and quantum architecture. The parity-check code 202 may be implemented as a classical [N,K,t] parity-check code and may be chosen such that the number "N" of quantum codewords and the number "t" of detectable errors in the data qubits meet the requirements of the chosen application and architecture.

One or more quantum check operators or stabilizers may be associated with the quantum error correcting code 201. In block 203, the computing device (e.g., the computing device 12, the host processor 166, and/or the like) implementing the logical syndrome compressor B (see FIG. 1B) selects or otherwise obtains at least one quantum check operator (represented by the variable S) associated with the quantum error correcting code 201.

The term "ancilla factory" is used to describe a quantum system used to prepare syndrome qubits either as single qubits or as multiple-qubit entangled states for use in quantum error correction or other processes during operation of the quantum computing system 100 (see FIG. 1A). An ancilla factory (not shown) prepares a number of syndrome qubits 204 either as single qubits or as multiple-qubit entangled states as described in the previous paragraphs for fault-tolerant operations. The ancilla factory (not shown) provides the syndrome qubits 204 to the quantum syndrome extractor G (see FIG. 1B) and/or other components of the quantum computing system 100 (see FIG. 1A).

In block 205, the quantum syndrome extractor G (see FIG. 1B) directs other components of the quantum computing system 100 to couple quantum codewords 206 to syndrome qubits 204 in the manner described previously and according to the quantum check operator chosen in block 203.

In block 207, the logical syndrome compressor B (see FIG. 1) may construct a logical syndrome compression matrix (e.g., according to Equation 1) using an identity matrix of appropriate size (represented by the variable Id) and a binary matrix (represented by the variable H). In such an embodiment, the binary matrix may be the parity-check matrix $H_L$ corresponding to the chosen parity-check code 202.

In block 207, the logical syndrome compressor B (see FIG. 1) directs other components of the quantum computing system 100 to couple the syndrome qubits 204 to the measure qubits 208 in accordance with the specification, which may be implemented as the logical syndrome compression matrix (e.g., determined using Equation 2 above).

In block 209, the measure qubits 208 are measured by the quantum measurement apparatus C (see FIG. 1B) to produce measurement outcomes, also referred to as a logical parity syndrome (e.g., having binary values). If only a single quantum check operator (or stabilizer) was selected in block 203, the logical parity syndrome is the full logical parity syndrome 210. On the other hand, if more than one quantum check operator (and/or stabilizer) was selected in block 203, blocks 205, 207, and 209 may be repeated for each quantum check operator (or stabilizer) and their logical parity syndromes combined to obtain the full logical parity syndrome 210. Thus, all of the quantum check operators (or stabilizers) associated with the quantum error correcting code 201 may be encoded and measured to produce the full logical parity syndrome 210. In block 212, the measurement apparatus C (see FIG. 1B) provides the full logical parity syndrome 210 to the logical parity decoder D (see FIG. 1B) and the logical parity decoder D determines the type and location of any errors present.

In decision block 214, the computing device (e.g., the computing device 12, the host processor 166, and/or the like) implementing the logical parity decoder D (see FIG. 1B) uses the full logical parity syndrome 210 to determine whether any errors are present in the quantum codewords 206. For example, if the full logical parity syndrome 210 contains only zeros, the computing device implementing the logical parity decoder D (see FIG. 1B) may determine, in decision block 214, that there are no errors in the quantum codewords 206. When the logical parity decoder D (see FIG. 1B) determines, in decision block 214, there are no errors in the quantum codewords 206, the method 200 stops. When the method 200 stops, the quantum codewords 206 are returned to the computing device (e.g., the computing device 12, the host processor 166, and/or the like) governing the execution of the quantum algorithm. If, on the other hand, the computing device implementing the logical parity decoder D (see FIG. 1B) determines, in decision block 214, that there are one or more errors in the quantum codewords 206 (e.g., the computing device implementing the logical parity decoder D determines the full logical parity syndrome 210 is non-zero), the decision in decision block 214 is "YES." When the decision in decision block 214 is "YES," in block 216, the computing device implementing the logical parity decoder D (see FIG. 1B) performs the logical parity decoding method 180 (see FIG. 5) to determine the error locations. Alternatively, the computing device implementing the logical parity decoder D may reconstruct the quantum error syndrome for each quantum codeword from the full logical parity syndrome 210. In this case, in block 218, the computing device (e.g., the computing device 12, the host processor 166, and/or the like) implementing the quantum decoder E (see FIG. 1B) may use the quantum error syndromes to determine the error locations. Finally, in block 220, the error locations are passed to the control hardware (e.g., the action components F) implementing the corrective actions to correct one or more errors in the data qubits of the quantum codewords 206. Then, the method 200 terminates.

Referring to FIG. 1B, the logical syndrome compressor B and the logical parity decoder D may be applied to any process that uses error correcting codes as a computational primitive. Quantum state distillation is one such application, where several noisy copies of the quantum resource state are distilled into higher fidelity states by measuring the quantum check operators (stabilizers) of a quantum error correcting code. By way of non-limiting examples, the methods described in references [8, 9, 10] may be employed for state distillation using quantum error correcting codes. In contrast to quantum error correction, however, in quantum state distillation quantum states are discarded if one or more errors are detected. Thus, in embodiments implementing quantum state distillation, the corrective action performed by the action component F is to discard the set of states that contain an error as detected and located by the logical syndrome compressor B and the logical parity decoder D. Using a [N,K,t] parity-check code specified by the parity-check matrix $H_L$, and a quantum error correcting code using n data qubits for each quantum codeword, the quantum syndrome extractor G, the logical syndrome compressor B, and the logical parity decoder D may be used to detect and locate errors in N·n noisy resource states simultaneously. To complete the state-distillation process, states with no errors, as determined by the logical parity decoder D, are joined by an unencoding procedure to produce a higher fidelity resource state as described in references [8, 9, 10].

Figure 7:
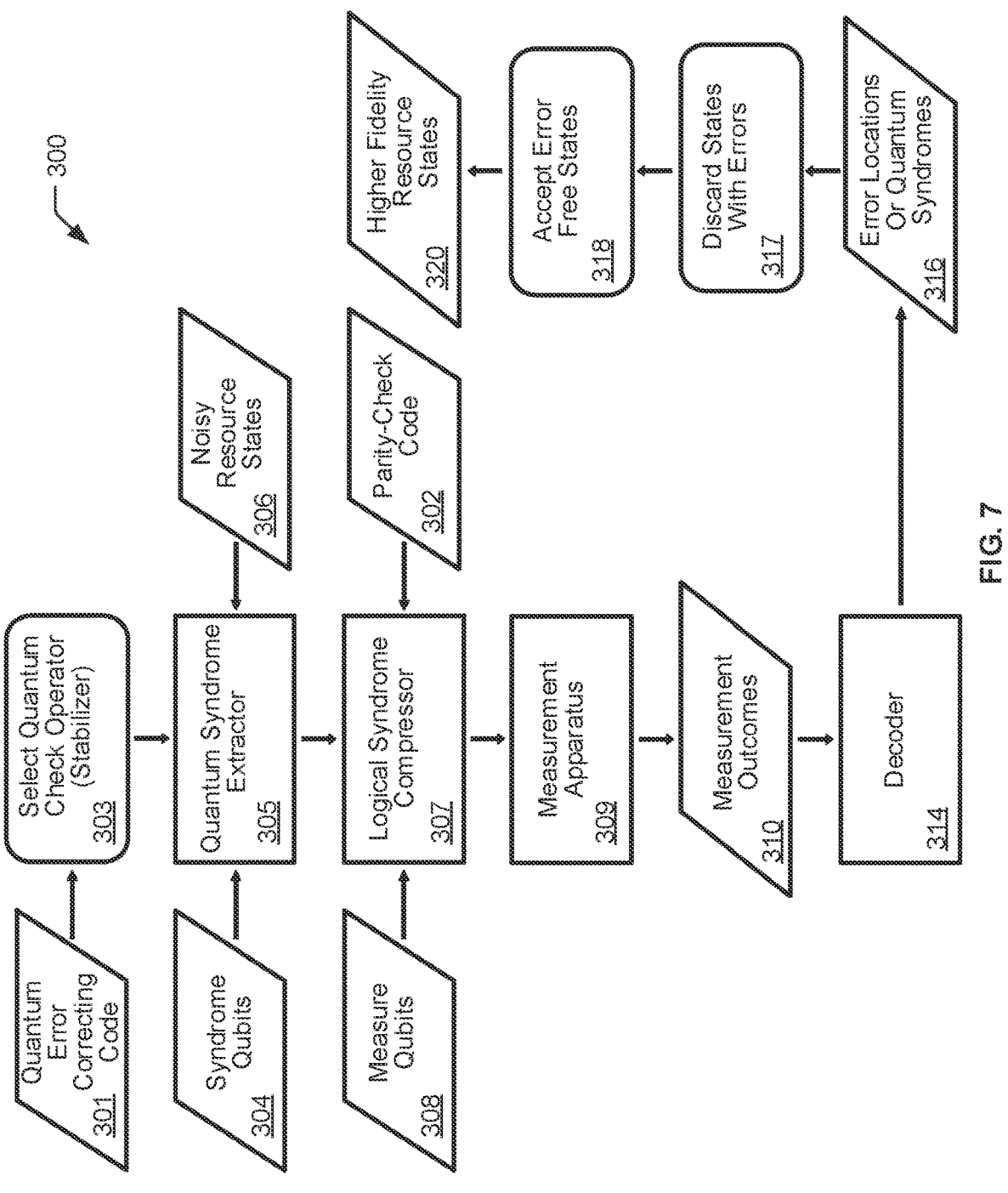
FIG. 7 Illustrates a process diagram of a method of quantum state distillation performed at least in part by the quantum syndrome extractor, the logical syndrome compressor, and the logical parity decoder of FIG. 1B.

FIG. 7 illustrates a process diagram of a method 300 performed at least in part by the logical syndrome compressor B (see FIG. 1B) and the logical parity decoder D (see FIG. 1B). The method 300 may be used to perform quantum state distillation as described in the previous paragraph. Prior to operation, one or more of the component(s) performing the method 300 may receive as input a quantum error correcting code 301 and a parity-check code 302. The quantum error correcting code 301 may be chosen to distill the desired quantum resource state that may include, as non-limiting examples, the |T) or the |HAD) quantum states as known to those of ordinary skill in the art. The quantum error correcting code 301 may use a number "n" of data qubits for each quantum codeword. The parity-check code 302 may be a classical [N,K,t] parity-check code chosen such that the number "N" of data qubits and number "t" of detectable errors in the data qubits meet the requirements of the chosen application and architecture.

In block 305, the computing device implementing the quantum syndrome extractor G (see FIG. 1B) selects or otherwise obtains at least one quantum check operator (represented by the variable S) associated with the quantum error correcting code 301.

At block 305, the quantum syndrome extractor G receives syndrome qubits 304 and one or more qubits having a number of N·n of noisy resource states 306. The quantum syndrome extractor G (see FIG. 1B) directs other components of the quantum computing system 100 (see FIG. 1A) to couple the noisy resource states 306 to syndrome qubits 304 in the manner described previously and according to the quantum check operator chosen in block 303. An ancilla factory (not shown) may prepare the syndrome qubits 304 either as single qubits or as multiple-qubit entangled states as described in the previous paragraphs for fault-tolerant operations. The ancilla factory (not shown) may provide the syndrome qubits 304 to the quantum syndrome extractor G (see FIG. 1B) and/or other components of the quantum computing system 100 (see FIG. 1A). The noisy resource states 306 may be prepared by other components of the quantum computing system 100 (see FIG. 1A) or may be output of a previous round of quantum state distillation. The noisy resource states 306 are provided to the quantum syndrome extractor G (see FIG. 1B).

In block 307, the logical syndrome compressor B may construct the logical syndrome compression matrix (e.g., according to Equation 1) using an identity matrix (represented by the variable Id) and a binary matrix (represented by the variable H). The binary matrix may be a parity-check matrix corresponding to the chosen parity-check code 302.

In block 307, the computing device implementing the logical syndrome compressor B (see FIG. 1B) directs other components of the quantum computing system 100 (see FIG. 1A) to couple the syndrome qubits 304 to measure qubits 308 in the manner described previously and according to the specification, which may be implemented as the resultant matrix $R_M$ obtained using the Equation 1 (above).

In block 309, the measure qubits 308 are measured by the quantum measurement apparatus C (see FIG. 1B) to produce measurement outcomes, also referred to as the logical parity syndrome (e.g., having binary values). If only a single quantum check operator (or stabilizer) was selected in block 303, the logical parity syndrome is the full logical parity syndrome 310. On the other hand, if more than one quantum check operator (and/or stabilizer) was selected in block 303, Blocks 305, 307, and 309 may be repeated for each for each quantum check operator (or stabilizer) and their logical parity syndromes combined to obtain the full logical parity syndrome 310. Thus, all of the quantum check operators (and/or stabilizers) associated with the quantum error correcting code 301 may be measured to produce the full logical parity syndrome 310. The measurement apparatus C (see FIG. 1B) provides the full logical parity syndrome 210 to the computing device implementing the logical parity decoder D (see FIG. 1B).

Figure 13:
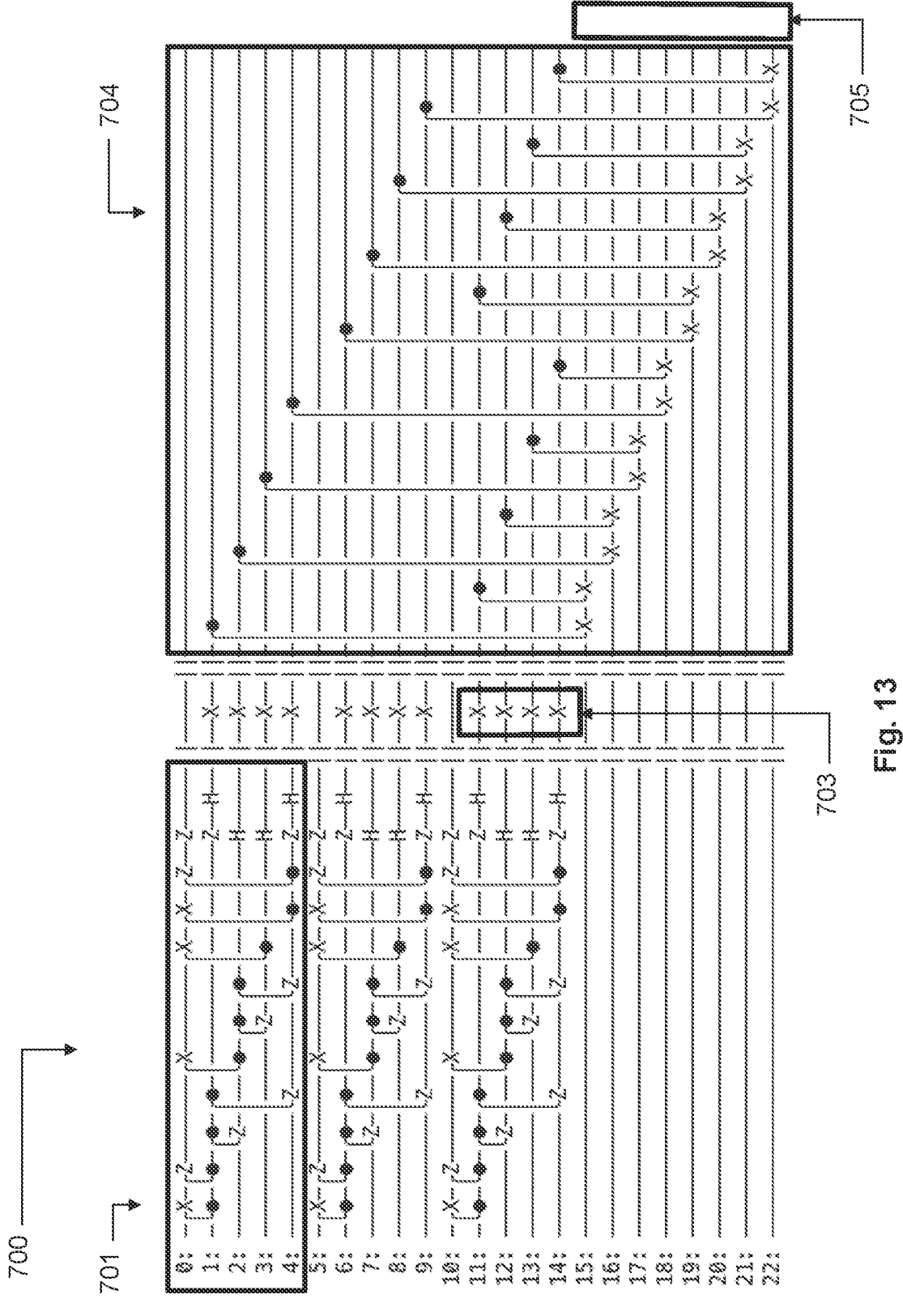
FIG. 13 illustrates an example of a first quantum circuit.

In block 314, the computing device implementing the logical parity decoder D (see FIG. 1B) uses the full logical parity syndrome 310 to determine the type and location of any errors 316 present in the noisy resource states 306. In block 317, the action component F (see FIG. 1B), implemented by the control hardware of the quantum computing system 100 (see FIG. 1A), discards any of the resource states 306 that contains an error as determined by the computing device implementing the logical parity decoder D (see FIG. 1B). Finally, in block 318, those of the resource states 306 without errors ("error free states") are accepted to produce higher fidelity resource states 320. Then, the method 300 terminates. FIG. 13 illustrates an example quantum circuit 700. A lefthand portion of the quantum circuit 700 implements the quantum syndrome extractor G (see FIG. 1B), and a righthand portion 704 of the quantum circuit 700 implements the logical syndrome compressor B (see FIG. 1B). The lefthand and righthand portions are separated from one another by an intermediate portion including a set of gates (e.g., that includes Pauli-X gates 703). In FIG. 13, qubits are numbered 0-22 and illustrated as rows labeled "0:" to "22:." The quantum circuit 700 receives, as input, the data qubits 102 (see FIG. 1B), the syndrome qubits 304 (see FIG. 7), and the measure qubits 308. In FIG. 13, the data qubits 102 are the qubits numbered 0, 5, and 10, the syndrome qubits 304 are the qubits numbered 1-4, 6-9, and 11-14, and the measure qubits 308 are the qubits numbered 15-22. The data qubits 102 may have the noisy resource states 306 illustrated in FIG. 7.

The quantum circuit 700 may perform state distillation (e.g., using the method 300). The method 300 receives, as an input, the quantum error correcting code 301 and the parity-check code 302. The quantum circuit 700 may be constructed based at least in part on the quantum error correcting code 301 and/or the parity-check code 302. For example, the quantum syndrome extractor G (see FIG. 1B) may be configured based at least in part on the quantum error correcting code 301. By way of another non-limiting example, the logical syndrome compressor B (see FIG. 1B) may be configured based at least in part on the parity-check code 302.

FIG. 13 illustrates the quantum circuit 700 performing logical syndrome compression (e.g., block 307 illustrated in FIG. 7) from three state distillation processes using a non-CSS 5-qubit code and a classical 3-bit repetition code. Thus, the quantum error correcting code 301 may be implemented as a non-CSS quantum code (e.g., a 5-qubit quantum code, the non-CSS 5-qubit code, and/or the like) and the parity-check code 302 may be implemented as a classical parity-check code (e.g., a 3-qubit repetition code, a low-density parity check code and/or the like). The quantum error correcting code 301 (e.g., the non-CSS quantum code) may include one or more stabilizers.

First, the noisy resource states 306 (see FIG. 7) are prepared (not shown in FIG. 13) in the qubits numbered 0-14. In other words, the data qubits 102 and the syndrome qubits 106 each have a noisy resource state. Next, quantum gates (e.g., X, Z, and H) of the quantum syndrome extractor G (shown on the lefthand portion of the quantum circuit 700) couple the data qubits 102 (see FIG. 1B) and the syndrome qubits 304 (see FIG. 7). For ease of illustration, the quantum error correcting code 301 has been illustrated in FIG. 13 as being a the 5-qubit quantum code. The quantum gates may be constructed from the stabilizers of the quantum error correcting code 301 (e.g., the 5-qubit quantum code). The quantum gates are performed on the qubits numbered 0-14 prepared as the noisy resource states 306. A box 701 identifies a first portion of the quantum syndrome extractor G applied to a first set of qubits including the qubits numbered 0-4. Likewise, a second portion of the quantum syndrome extractor G may be applied to a second set of qubits including the qubits numbered 5-9, and a third portion of the quantum syndrome extractor G may be applied to a third set of qubits including the qubits numbered 10-14. Each of the first, second, and third portions may include quantum gates constructed from the stabilizers of the quantum error correcting code 301 (e.g., the 5-qubit quantum code). The quantum gates of the first, second, and third portions are performed on the first, second, and third sets, respectively, of the qubits numbered 0-14.

In the embodiment illustrated in FIG. 13, each of the first, second, and third portions of the quantum syndrome extractor G (that operates on one of the 5-qubit sets) may be generated in accordance with the binary matrix $H_Q$ defined by the Equation 4 above, which may include additional single-qubit gates (e.g., Z and H). In this embodiment, the full quantum syndrome extractor G may be generated in accordance with a binary matrix $Id_3 \otimes H_Q$ where $Id_3$ is a 3×3 identity matrix.

Following the quantum syndrome extractor G (illustrated on the lefthand portion of the quantum circuit 700), in this embodiment, the syndrome qubits 304 pass through the gates of the intermediate portion of the quantum circuit 700. In FIG. 13, the syndrome qubits 304 (shown as the qubits numbered 1-4, 6-9, and 11-14) are flipped by Pauli-X gates. For example, the qubits numbered 11-14 are flipped by the Pauli-X gates 703.

Next, the syndrome qubits 304 (shown as the qubits numbered 1-4, 6-9, and 11-14) and the measure qubits 308 (shown as the qubits numbered 15-22) pass through gates of the logical syndrome compressor B (depicted on the righthand portion 704 of the quantum circuit 700). The data qubits 102 are either accepted or discarded based on in which state of the data qubits 102 are in as determined by the syndrome (determined by the logical syndrome compressor B) and outputs of the decoder (e.g., in block 314 of FIG. 7). The decoder (e.g., in block 314 of FIG. 7) may be implemented using the logical parity decoder D or another type of decoder, for example, because, for state distillation, the measurement outcomes may not correspond exactly to the logical parity syndrome. In at least one embodiment, state distillation is successful and the state is to be accepted if and only if the syndrome qubits 304 (the qubits numbered 1-4, 6-9, and 11-14) are in the |0> state. In a quantum circuit 700, by way of example, the logical syndrome compressor B (depicted in righthand portion 704) is specified by CNOT gates between the syndrome qubits 304 (the qubits numbered 1-4, 6-9, and 11-14) and the measure qubits 308 (the qubits numbered 15-22). Each of the CNOT gates may use one of the syndrome qubits 304 as a control qubit. Thus, in this embodiment, the syndrome qubits 304 are flipped by the Pauli-X gates in the intermediate portion (e.g., the Pauli-X gates 703) and successful distillation occurs if the syndrome qubits 304 are in the |1> state. Next, the logical syndrome compressor B is performed using the specification (e.g., the resultant matrix $R_M$) based on the parity-check code 302 (e.g., 3-bit classical repetition parity-check code).

$$H_L \otimes Id_4 = R_M \qquad \text{Equation 7}$$

$$= \begin{bmatrix} 1 & 0 & 1 \\ 0 & 1 & 1 \end{bmatrix} \otimes \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

$$= \begin{bmatrix} 1 & 0 & 0 & 0 & 0 & 0 & 0 & 0 & 1 & 0 & 0 & 0 \\ 0 & 1 & 0 & 0 & 0 & 0 & 0 & 0 & 0 & 1 & 0 & 0 \\ 0 & 0 & 1 & 0 & 0 & 0 & 0 & 0 & 0 & 0 & 1 & 0 \\ 0 & 0 & 0 & 1 & 0 & 0 & 0 & 0 & 0 & 0 & 0 & 1 \\ 0 & 0 & 0 & 0 & 1 & 0 & 0 & 0 & 1 & 0 & 0 & 0 \\ 0 & 0 & 0 & 0 & 0 & 1 & 0 & 0 & 0 & 1 & 0 & 0 \\ 0 & 0 & 0 & 0 & 0 & 0 & 1 & 0 & 0 & 0 & 1 & 0 \\ 0 & 0 & 0 & 0 & 0 & 0 & 0 & 1 & 0 & 0 & 0 & 1 \end{bmatrix}$$

The specification may also be referred to as a logical syndrome compression matrix (e.g., the resultant matrix $R_M$). In Equation 7 above, a variable $Id_4$ represents a 4×4 identity matrix, and the parity-check matrix $H_L$ is a binary matrix corresponding to the parity-check matrix of the parity-check code 302 (e.g., 3-qubit classical repetition code). The righthand portion 704 of the quantum circuit 700 implements the logical syndrome compressor B that couples the syndrome qubits 304 (e.g., the qubits numbered 1-4, 6-9, and 11-14) to the measure qubits 308 (e.g., the qubits numbered 15-22) and is generated in accordance with Equation 7.

Next, the logical syndrome compressor B outputs the measure qubits 308 (e.g., the qubits numbered 15-22) to the quantum measurement apparatus C (see FIG. 1B). In FIG. 13, the output measure qubits 308 are depicted by a box 705. The quantum measurement apparatus C (e.g., in block 309 of FIG. 7) measures the measure qubits 308 to obtain measurement outcomes (e.g., the full logical parity syndrome 310 of FIG. 7) which are then passed to the decoder (e.g., in block 314 of FIG. 7) to determine which resource states (of qubits numbered 0, 4, and 9 in FIG. 13) to accept and which resource states to discard. In this embodiment, the decoder may be configured to operate based on the classical parity-check matrix $H_L \otimes Id_4$.

The distillation process performed by the quantum circuit 700 may be repeated with reset syndrome and measure qubits and the accepted resource states to distill higher fidelity resource states.

Figure 14:
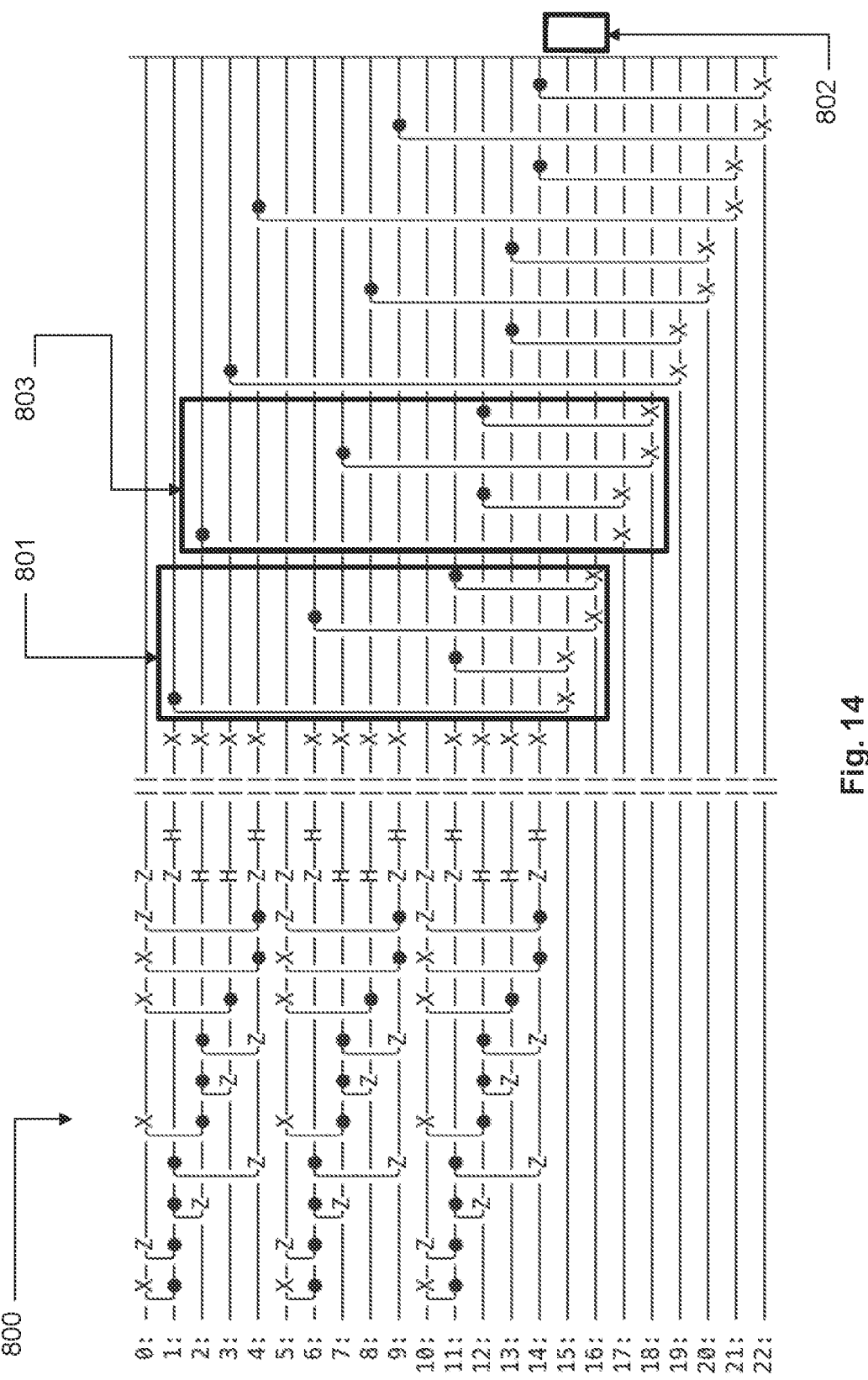
FIG. 14 illustrates an example of a second quantum circuit.

The logical syndrome compressor B (see FIG. 1B) may be configured for quantum state distillation according to an adaptive measurement schedule. Referring to FIG. 14, a quantum circuit 800 may be used to perform logical syndrome compression according to a measurement schedule (e.g., an adaptive measurement schedule). A lefthand portion of the quantum circuit 800 implements the quantum syndrome extractor G (see FIG. 1B), and a righthand portion of the quantum circuit 800 implements the logical syndrome compressor B (see FIG. 1B). The lefthand and righthand portions are separated from one another by an intermediate portion including a set of gates (e.g., that includes Pauli-X gates). The quantum circuit 800 receives, as input, the data qubits 102 (see FIG. 1B), the syndrome qubits 106 (see FIG. 1B), and the measure qubits 107 (see FIG. 1B). In FIG. 14, the data qubits 102 are the qubits numbered 0, 5, and 10, the syndrome qubits 106 are the qubits numbered 1-4, 6-9, and 11-14, and the measure qubits 107 are the qubits numbered 15-22. In the embodiment of FIG. 14, the logical syndrome compressor B (see FIG. 1B) couples the syndrome qubits 106 (e.g., the qubits numbered 1-4, 6-9, and 11-14) to the measure qubits 107 (e.g., the qubits numbered 15-22) according to a subset of the rows of the logical syndrome compressor matrix (see Equation 7).

After preparing noisy resource states (not shown in FIG. 14), the quantum syndrome extractor G performs operations on the syndrome qubits 106 and data qubits 102 (qubits 0-14 collectively in FIG. 14). In this embodiment, the syndrome qubits 106 are flipped by the Pauli-X gates in the intermediate portion and successful distillation occurs if the syndrome qubits 106 are in the |1> state. Next, the logical syndrome compressor B (see FIG. 1B) couples the syndrome qubits 106 to the measure qubits 107 with a specification generated according to a subset of rows of the logical syndrome compressor matrix (see Equation 7). A box 801 illustrates logical syndrome compression according to rows 1 and 5 of the logical syndrome compression matrix Eq. 7. In this embodiment, the qubits numbered 0-14 may be divided into first, second, and third distillation blocks that include qubits numbered 0-4, 5-9, and 10-14, respectively. In this embodiment, the logical syndrome compressor B (see FIG. 1B) is configured according to rows 1 and 5 of the logical syndrome compression matrix (see Eq. 7) and couples the first syndrome qubit (qubits numbered 1, 6 and 11) of each distillation block to selected ones of the measure qubits (e.g., qubits numbered 15 and 16). The selected measure qubits (e.g., qubits numbered 15 and 16) are measured at block 802 (e.g., by the quantum measurement apparatus C of FIG. 1B) and the resultant measurement outcomes are passed to the decoder (e.g., at block 314 of FIG. 7). The decoder may be implemented using the logical parity decoder D or another type of decoder. The decoder then determines which of the syndrome qubits 106 are in the |1> state. For any syndrome qubit not found in the |1> state the logical syndrome compressor method 170 and/or the method 300 discards the distillation block to which the syndrome qubit found in other than the |1> state belongs. If one or more of the distillation blocks is discarded, the logical syndrome compressor B may adapt the logical syndrome compression matrix (see Eq. 7) to the resultant dimensions and generate another quantum circuit to continue logical syndrome compression for state distillation. If none of the distillation blocks are discarded by the decoder (e.g., at block 314 of FIG. 7), then the logical syndrome compressor B selects rows from the logical syndrome compression matrix for measurement.

By way of example, a box 803 (see FIG. 14) illustrates the next couplings selected by the logical syndrome compressor B to couple the second qubit from each distillation block (qubits numbered 2, 7, and 12) according to the 3-bit classical repetition code to selected ones of the measure qubits (e.g., the qubits numbered 17 and 18). Measurement outcomes from the qubits numbered 17 and 18 are passed to the decoder (e.g., at block 314 of FIG. 7) to determine which of the second syndrome qubits (e.g., qubits numbered 2, 7, and 12) are in the |1> state. For any syndrome qubit not found in the |1> state, the logical syndrome compressor method 170 and/or the method 300 discards the distillation block to which the syndrome qubit not found in the |1> state belongs. If one or more of the distillation blocks is/are discarded, the logical syndrome compressor B may adapt the logical syndrome compression matrix (see Eq. 7) to the resultant dimensions and generate another quantum circuit to continue logical syndrome compression for state distillation. If none of the distillation blocks are discarded by the decoder (e.g., at block 314 of FIG. 7), then the logical syndrome compressor B selects rows from the logical syndrome compression matrix to generate the specification for coupling syndrome qubits to measure qubits. In this manner, the host processor 166 uses the quantum circuit 800 and one or more other quantum circuits to perform an adaptive measurement strategy that implements the adaptive measurement schedule, which continues to discard and resize the logical syndrome compression matrix to accommodate the remaining data qubits (and syndrome qubits) that have not yet been discarded. The process continues in a similar manner for the third qubit from each distillation block (qubits numbered 3, 8, and 13), which are coupled to elected ones of the measure qubits (e.g., the qubits numbered 19 and 20), and the fourth qubit from each distillation block (qubits numbered 4, 9, and 14), which are coupled to elected ones of the measure qubits (e.g., the qubits numbered 21 and 22).

As known to those of ordinary skill in the art, multiple-qubit entangled states, which may include "cat," "GHZ", "cluster," "graph states," and quantum codewords as non-limiting examples, may be used as syndrome blocks for fault-tolerant syndrome measurement, measurement-based quantum computing, or as quantum codewords as non-limiting examples. These entangled states may be verified to be error free before being used by other processes of the quantum computing system 100 (see FIG. 1A). The logical syndrome compressor B and the logical parity decoder D may be used to implement an ancilla factory that may prepare an error free target multiple-qubit entangled state. Multiple-qubit entangled states may be verified to be error free by specifying a verification circuit that couples the multiple-qubit entangled states to additional syndrome qubits that are then measured to signal errors. In this configuration, the logical syndrome compressor B (see FIG. 1B) is specified by a parity-check matrix of a classical error correcting code and a quantum check operator implementing the verification circuit of the entangled state. Using a [N,K,t] parity-check code, the logical syndrome compressor B and the logical parity decoder D may be used to verify and locate errors in the preparation of N entangled states simultaneously. Referring to FIG. 1B, in the embodiment of state preparation and verification, the quantum encoder A prepares the multiple-qubit entangled state and the action component F discards multiple-qubit entangled states that contain errors as determined by the logical parity decoder D.

Figure 8:
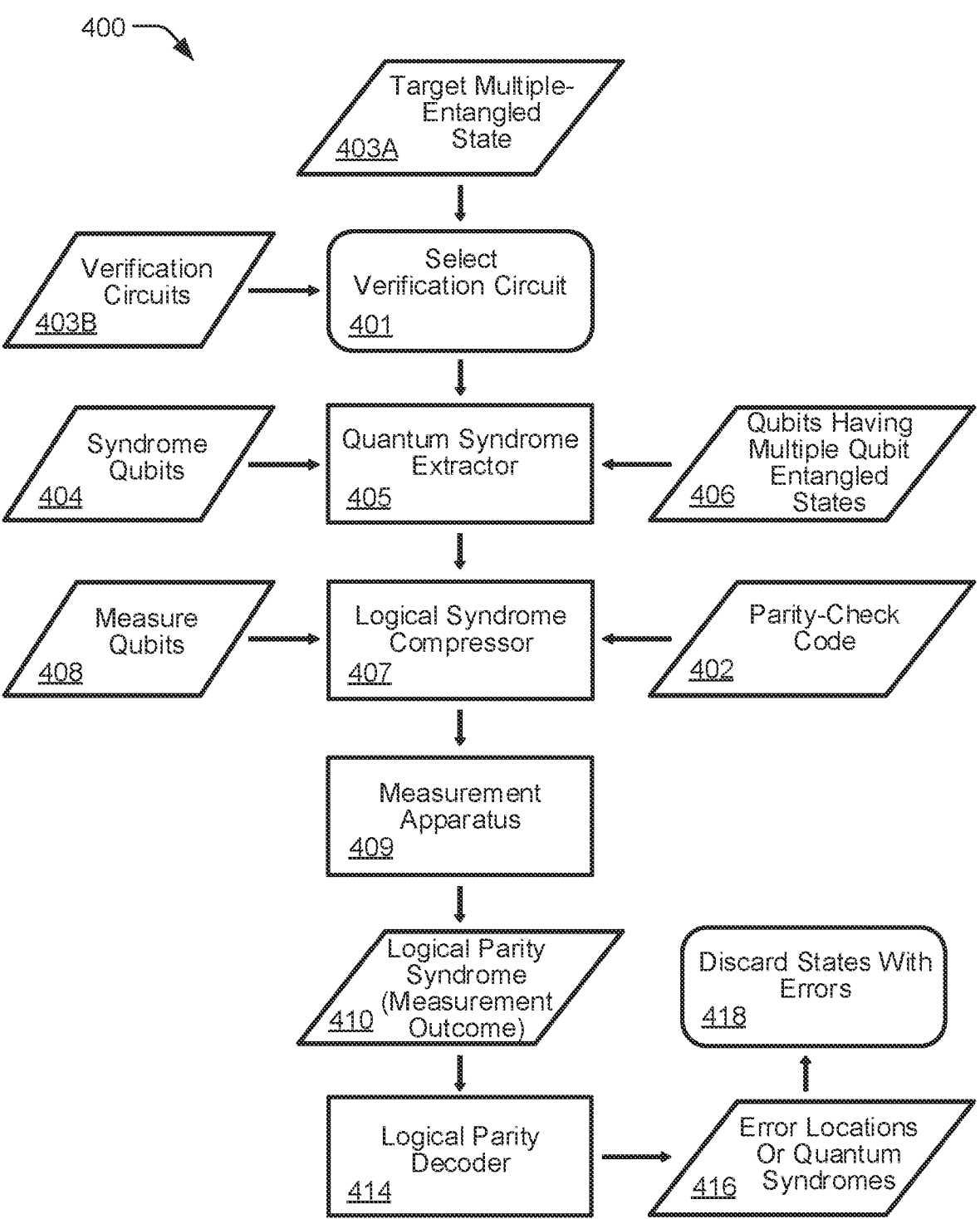
FIG. 8 Illustrates a process diagram of a method of preparing and verifying multiple-qubit entangled states performed at least in part by the quantum syndrome extractor, the logical syndrome compressor, and the logical parity decoder of FIG. 1B.

FIG. 8 illustrates a process diagram of a method 400 that may be performed at least in part by the logical syndrome compressor B (see FIG. 1B) and the logical parity decoder D (see FIG. 1B). The method 400 may be used to prepare and verify multiple-qubit entangled states. Prior to operation, one or more of the component(s) performing the method 400 may receive as input a target multiple-entangled state 403A using a number "n" of qubits, a corresponding set of verification circuits 403B used to determine if the multiple-qubit entangled states are error free, and a parity-check code 402. The parity-check code 402 may be implemented as a classical [N,K,t] parity-check code, for example, chosen such that the number "N" of multiple-qubit entangled states and number "t" of detectable errors in the data qubits meets the requirements of the chosen application and architecture.

In block 401, the computing device (e.g., the computing device 12, the host processor 166, and/or the like) implementing the logical syndrome extractor G (see FIG. 1B) chooses or selects a verification circuit from the set of verification circuits 403B. The computing device implementing the logical syndrome extractor G may receive qubits 406 having a number "N" of multiple-qubit entangled states (e.g., prepared by a quantum computer, such as the quantum computing system 100). At least one of the set of verification circuits 403B may be used to determine which of the qubits 406 have the target multiple-entangled state 403A. Those of the qubits 406 having the target multiple-entangled state 403A are referred to as being error free.

In block 405, the quantum syndrome extractor G directs other components of the quantum computing system 100 (see FIG. 1A) to couple the qubits 406 having the multiple-qubit entangled states to syndrome qubits 404.

In block 407, the computing device implementing the logical syndrome compressor B (see FIG. 1B) directs other components of the quantum computing system 100 (see FIG. 1A) to couple the syndrome qubits 404 to the measure qubits 408 in the manner described previously and according to the specification, which may be implemented as the resultant matrix $R_M$ (obtained using the Equation 1 above).

In block 409, the syndrome qubits 404 are measured by the quantum measurement apparatus C (see FIG. 1B) to produce measurement outcomes, also referred to as the logical parity syndrome (e.g., having binary values). If only a single verification circuit was selected in block 401, the logical parity syndrome is the full logical parity syndrome 410. On the other hand, if more than one verification circuit was selected in block 401, blocks 405, 407, and 409 may be repeated for each verification circuit chosen and their logical parity syndromes combined to obtain the full logical parity syndrome 410. Thus, all of the verification circuits 403B required to verify the target multiple-qubit entangled state 403A may be used to produce the full logical parity syndrome 410.

In block 414, the computing device implementing the logical parity decoder D (see FIG. 1B) uses the full logical parity syndrome 410 to determine the type and location of any errors 416 present in the qubits 406 having the multiple-qubit entangled states. In block 418, the action component F (see FIG. 1B), implemented by the control hardware of the quantum computing system 100, discards any of the qubits 406 containing an error as determined by the computing device implementing the logical parity decoder D. Then, the method 400 terminates.

One or more of the techniques described may be used to perform decoding using a reduced set of measurement outcomes which may provide a faster and/or more scalable computational decoding procedure. One or more of the techniques described may perform syndrome extraction from the data qubits only once, but may perform the logical syndrome compressor method 170 (see FIG. 4) and the logical parity decoding method 180 (see FIG. 5) multiple times without interacting the data qubits. It may be desirable to avoid interacting with the data qubits because such interaction may leave additional (undetectable) errors in the measurement data. Performing both of the methods 170 and 180 more than once may improve decoding accuracy and resolve additional errors that may occur in the measurement process.

Logical Parity Non-CSS Encoder and Related Methods

As mentioned herein, non-CSS quantum codes (which may include the 5-qubit code and the XZZX surface code) identify both Pauli-X and Pauli-Z errors and their locations from the same set of measurement outcomes. In embodiments using non-CSS quantum codes, the quantum check operators used may be one or more non-CSS quantum check operators composed of both Pauli-X and Pauli-Z operators (e.g., the 5-qubit code check operator ZXIXZ) and the matrix Ho may be constructed by arranging binary representation(s) of the non-CSS quantum check operator(s) used by the quantum syndrome extractor G in rows partitioned into separate blocks for the Pauli-X operators and Pauli-Z operators. By way of a non-limiting example, the matrix $H_Q$ may be determined using Equation 4 (above).

Figure 10:
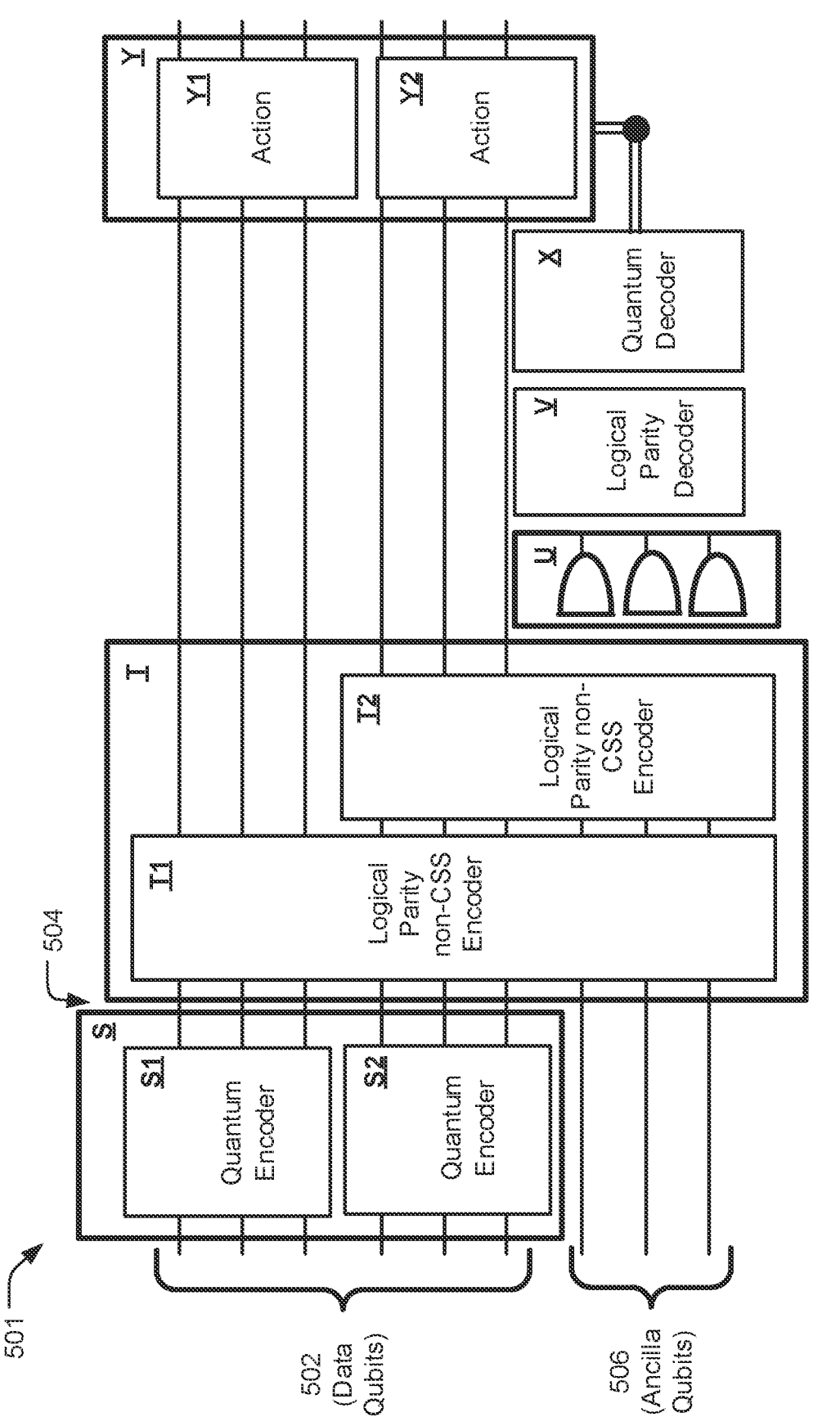
FIG. 10 illustrates a second quantum system that includes a quantum encoder, a logical parity non-CSS encoder, and a logical parity decoder and may perform quantum encoding, measurement, quantum decoding, post-selection and correction.

FIG. 10 illustrates a second example quantum system 501 that may be implemented by the quantum computing system 100. In the quantum system 501, a parity-check code and a quantum error correcting code are used to detect and locate errors in quantum computing and related processes. The quantum system 501 includes a quantum encoder S, a logical parity non-CSS encoder T, a measurement apparatus U, a logical parity decoder V, a quantum decoder X1, and an action component Y. The quantum encoder S, the measurement apparatus U, the logical parity decoder V, the quantum decoder X1, and the action component Y may be substantially identical to the quantum encoder A (see FIG. 1B), the measurement apparatus C, the logical parity decoder D, the quantum decoder E, and the action component F, respectively. Further, the quantum encoder S, the measurement apparatus U, the logical parity decoder V, the quantum decoder X1, and the action component Y may be implemented using any component(s) suitable for implementing the quantum encoder A (see FIG. 1B), the measurement apparatus C, the logical parity decoder D, the quantum decoder E, and the action component F, respectively. A plurality of data qubits 502, a plurality of ancilla qubits 506, and the measurement apparatus U may reside in the quantum data plane 160 (see FIG. 1A). The quantum encoder S, the logical parity non-CSS encoder T, the logical parity decoder V, the quantum decoder X1, and the action component Y may be implemented in software executing on the host processor 166 (see FIG. 1A). However, these components may communicate with the quantum data plane 160 via the control and measurement plane 162 (see FIG. 1A) and the control processor plane 164 (see FIG. 1A).

For ease of illustration, the quantum encoder S has been illustrated as including two portions S1 and S2. However, the quantum encoder S may include any number of portions and the portions S1 and S2 may be implemented as a single quantum encoder. Similarly, the logical parity non-CSS encoder T has been illustrated as including the two portions T1 and T2. However, the logical parity non-CSS encoder T may include any number of portions and the portions T1 and T2 may be implemented as a single logical parity encoder. Additionally, the action component Y has been illustrated as including two portions Y1 and Y2. However, the action component Y may include any number of portions and the portions Y1 and Y2 may be implemented as a single action component.

In FIG. 10, the quantum encoder S receives the plurality of data qubits 502 and produces a plurality of quantum codewords 504 (illustrated as lines or "wires" output by the quantum encoder S). In the embodiment illustrated, the portion S1 of the quantum encoder S encodes a first portion of the data qubits 502 into a first portion of the quantum codewords 504 using a non-CSS quantum code. Similarly, the portion S2 of the quantum encoder encodes a second portion of the data qubits 502 into a second portion of the quantum codewords 504 using the non-CSS quantum code. The plurality of quantum codewords 504 are used to carry the quantum information.

To execute a quantum algorithm, quantum logic gates (not shown in FIG. 10) are performed on the logical qubits contained in the quantum codewords 504 by the quantum data plane 160 (see FIG. 1A). Errors that occur during the execution of quantum logic gates on the quantum codewords 504 or when the quantum codewords 504 are idle may be detected, located, and corrected by an error correcting procedure, such as the logical parity non-CSS encoding method 670 (see FIG. 11) and the logical parity decoding method 680 (see FIG. 12).

After one or more logic gates are performed on the data qubits (e.g., during the quantum algorithm), the logical parity non-CSS encoder T couples the quantum codewords 504 to the ancilla qubits 506 so that the logical parity decoder V may extract information about errors from the quantum codewords 504 without destroying the quantum information held in the quantum codewords 504. Thus, after the quantum encoder S produces the quantum codewords 504, the quantum logic gates of the quantum algorithm are performed on the logical qubits contained in the quantum codewords 504. After the quantum logic gate(s), the logical parity non-CSS encoder T performs the logical parity non-CSS encoding method 670 (see FIG. 11), which couples each of the quantum codewords 504 (see FIG. 10) to multiple ancilla qubits according to a binary matrix associated with a non-CSS quantum code and optionally a classical error correcting code. In FIG. 10, the portion T1 of the logical parity non-CSS encoder T couples the quantum codewords 504 received from the portion S1 of the quantum encoder S to the ancilla qubits 506 and similarly the portion T2 of the logical parity non-CSS encoder T couples the quantum codewords 504 received from the portion S2 of the quantum encoder S to the ancilla qubits 506.

Next, the ancilla qubits 506 are measured by the measurement apparatus U to obtain measurement data, which is communicated to the host processor 166 (see FIG. 1A) by the control and measurement plane 162 (see FIG. 1A) and the control processor plane 164 (see FIG. 1A) as binary valued measurement outcomes. In the quantum system 501 illustrated in FIG. 10, the logical parity syndrome includes the resulting binary valued measurement outcomes. The logical parity syndrome and a binary matrix (e.g., a parity-check matrix, a sub-parity-check matrix, a parity-check matrix pre-multiplied by a generator matrix, and the like) associated with a classical error correcting code are sent to the logical parity decoder V. Then, the logical parity decoder V performs the logical parity decoding method 680 (see FIG. 12) that uses the measurement outcomes to infer where errors (if any) occurred in the quantum codewords 504.

In the embodiment illustrated in FIG. 10, the logical parity non-CSS encoder T, the measurement apparatus U, and the logical parity decoder V may construct the full logical parity syndrome by measuring multiple non-CSS quantum check operators in a sequential and/or parallel configuration. Using the full logical parity syndrome, the logical parity decoder V may complete the identification of error types (e.g., Pauli-X type errors, Pauli-Z type errors, and/or the like) and error locations.

Some quantum error correcting codes may require additional processing to disambiguate complex error patterns. In such cases, the quantum error syndrome associated with the chosen quantum error correcting code may be computed from the full logical parity syndrome and passed to the quantum decoder X1, which may identify the error types and any of the data qubits containing errors. The error types and error locations produced by the logical parity decoder V or the quantum decoder X1 are then passed to the action component Y, which applies one or more corrective actions to any of the data qubits 502 with errors to thereby restore the data qubits 502 to their correct original state prior to the error(s) having occurred. By restoring the data qubits 102 to their correct and original states existing prior to the error(s) having occurred, the quantum codewords 504 are also restored to their states prior to the error(s) having occurred.

The logical parity non-CSS encoder T and the logical parity decoder V are compatible with an arbitrary arrangement of data qubits into quantum codewords. In other words, the logical parity non-CSS encoder T and the logical parity decoder V both function or may be configured to function with any arrangement of the data qubits 502 into the quantum codewords 504. Referring to FIG. 2, the logical parity non-CSS encoder T may (see FIG. 10) conceptually arrange the data qubits 502 (see FIG. 10) in the rectangular array 110.

Referring to FIG. 10, the logical parity decoder V infers error patterns acting on the data qubits 502 that may include Pauli-X errors (quantum bit-flips) and Pauli-Z errors (quantum phase flips) as non-limiting examples. An error pattern acting on the data qubits 502 may be represented by an array containing identity operators and error operators with dimensions matching the rectangular representation (e.g., the rectangular array 110 illustrated in FIG. 2) of the data qubits 102. The logical parity decoder V may represent the error pattern by the rectangular array 114 (see FIG. 3). Alternatively, the error pattern may be represented by the binary rectangular array 116 (see FIG. 3) with dimensions matching those of the rectangular array 110.

Figures 11, 12:
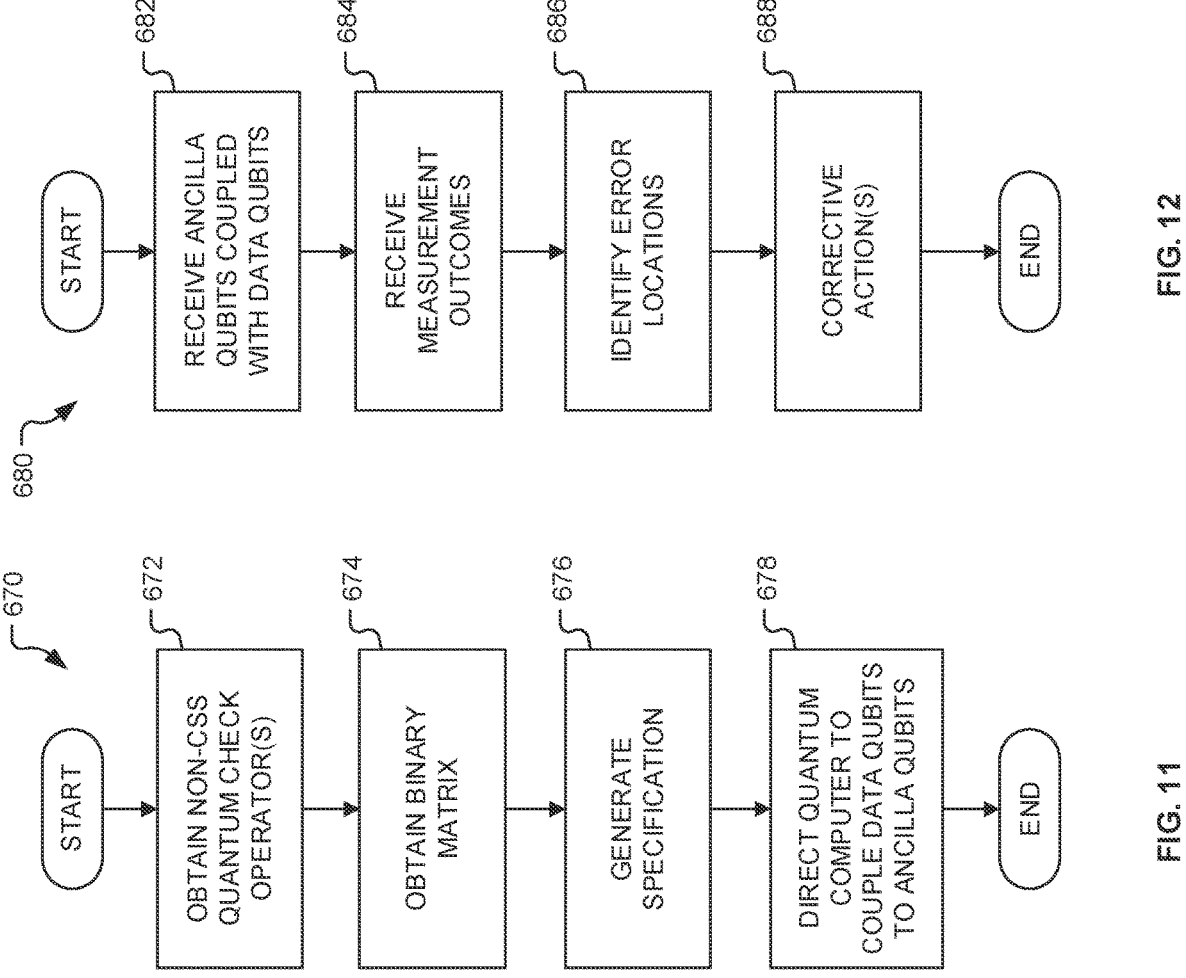
FIG. 11 is a flow diagram of a logical parity non-CSS encoding method that may be performed at least in part by the logical parity non-CSS encoder of FIG. 10.
FIG. 12 is a flow diagram of a logical parity decoding method that may be performed at least in part by the logical parity decoder of FIG. 10.

FIG. 11 is a flow diagram of the logical parity non-CSS encoding method 670 that uses a non-CSS quantum code and may be performed at least in part by the logical parity non-CSS encoder T (see FIG. 10). The logical parity non-CSS encoding method 670 couples each of the quantum codewords 504 (see FIG. 10) to multiple ancilla qubits according to a binary matrix associated with a non-CSS quantum code and optionally a classical error correcting code.

In first block 672, the logical parity non-CSS encoder T obtains one or more non-CSS quantum check operators. Referring to FIG. 10, the logical parity non-CSS encoder T and the logical parity decoder V may be configured to operate with a variety of non-CSS quantum error detecting and quantum error correcting codes. The chosen quantum error detecting or quantum error correcting code is implemented by the quantum encoder S (that operates in the usual manner to create quantum codewords) and specifies a set of non-CSS quantum check operators that may be encoded by the logical parity non-CSS encoder T and decoded by the logical parity decoder V. By way of a non-limiting example, the logical parity non-CSS encoder T may obtain the non- CSS quantum check operator(s) from the quantum encoder S. Alternatively, the non-CSS quantum check operator(s) may be a parameter(s) set provided by a user.

Next, in block 674, the logical parity non-CSS encoder T obtains the binary matrix (represented by the variable $H_L$).

Then, in block 676, the logical parity non-CSS encoder T generates a specification from the binary matrix (represented by the variable $H_L$) and the non-CSS quantum check operator(s) (represented by the variables $H_X$ and $H_Z$) associated with a non-CSS quantum code. The specification indicates which of the ancilla qubits 506 (see FIG. 10) are to be coupled to which of the data qubits 502 (see FIG. 10) in the quantum codewords 504 (see FIG. 10). Further, the specification for the logical parity non-CSS encoding method 670 may be generated in accordance with the logical parity configuration matrix from Equation 6 above.

Referring to FIG. 11, after the specification is generated, the logical parity non-CSS encoder T (see FIG. 10) may construct a quantum circuit in accordance with the specification. The logical parity non-CSS encoder T is executed by the host processor 166 (see FIG. 1A). Instructions issued by the logical parity non-CSS encoder T executing on the host processor 166 are passed to the control processor plane 164 (see FIG. 1A), which identifies and triggers quantum operations (e.g., gates) and measurements to be performed by the control and measurement plane 162 (see FIG. 1A) on the quantum data plane 160 (see FIG. 1A). In this manner, the logical parity non-CSS encoder T constructs the quantum circuit.

For example, referring to FIG. 10, the logical parity non-CSS encoder T may construct the quantum circuit from the resultant matrix $T_M$ (Equation 6) by coupling the data qubits 502 to the ancilla qubits 506 as follows. A multiple-qubit gate, which may include a controlled-PHASE gate ("C-PHASE gate") couples data qubit "j" to ancilla qubit "i" if, and only if, the binary number located in the i-th row and j-th column of the submatrix $[H_L \otimes H_X]$ of the resultant matrix is $T_M$ (Equation 6) is "1." On the other hand, if the binary number located in the i-th row and j-th column of the submatrix $[H_L \otimes H_X]$ is "0," the data qubit $|\psi_j\rangle$ remains uncoupled from the ancilla qubit $|A_i\rangle$. Next, the logical parity non-CSS encoder T adds a multiple-qubit gate, which may in include CNOT and C-PHASE gates, to the quantum circuit to couple data qubit "j" to ancilla qubit "i" if, and only if, the binary number located in the i-th row and j-th column of the submatrix $[H_L \otimes H_Z]$ of the resultant matrix is $T_M$ (Equation 6) is "1." On the other hand, if the binary number located in the i-th row and j-th column of the submatrix $[H_L \otimes H_Z]$ is "0," the data qubit $|\psi_j\rangle$ remains uncoupled from the ancilla qubit $|A_i\rangle$. To change the measurement basis, the logical parity non-CSS encoder may add single-qubit gates, which may include one or more Hadamard gates, to operate on the ancilla qubits in the circuit before and after the multiple-qubit gates.

In block 678 of FIG. 11, the logical parity non-CSS encoder T (see FIG. 10) directs the quantum hardware components to couple each of selected ones of the data qubits 502 (see FIG. 10) to one or more of the ancilla qubits 506 (see FIG. 10) in accordance with the couplings indicated in the specification. For example, the logical parity non-CSS encoder T may use the quantum circuit to couple one or more of the data qubits 502 to one or more of the ancilla qubits 506.

Then, after block 678, the logical parity non-CSS encoding method 670 may terminate.

FIG. 12 is a flow diagram of the logical parity decoding method 680 that may be performed at least in part by the logical parity decoder V (see FIG. 10) when the logical parity decoder V is operating with the logical parity non-CSS encoder T (see FIG. 10).

In first block 682, the logical parity decoder V (see FIG. 10) receives the data qubits 502 (see FIG. 10) coupled with the ancilla qubits 506 (see FIG. 10).

The data qubits 502 may have been coupled with the ancilla qubits 506 by the logical parity non-CSS encoder T (see FIG. 10) performing the logical parity non-CSS encoding method 670 (see FIG. 11).

Then in block 684, the logical parity decoder V (see FIG. 10) receives measurement outcomes (e.g., an array of measurement outcomes) from the measurement apparatus U (see FIG. 10).

Next in block 686, the logical parity decoder V (see FIG. 10) identifies a location for each error (if any) in the data qubits 502. In block 686, the logical parity decoder V (see FIG. 10) may use the logical parity configuration matrix (Equation 6) and measurement outcomes obtained (by the measurement apparatus U illustrated in FIG. 10) from the ancilla qubits 506 (see FIG. 10) to infer, for each error detected (if any), the error location and type of error that occurred in the quantum codewords 504 (see FIG. 10). If any errors are detected, located, and identified by the logical parity decoder V and/or the quantum decoder X1 (see FIG. 10), in block 688 the host processor 166 (see FIG. 1A) instructs the action components Y (see FIG. 10) to perform corrective actions on the data qubits 502 (see FIG. 10).

Then, after block 688, the logical parity decoder method 680 may terminate.

Computing Device

Figure 9:
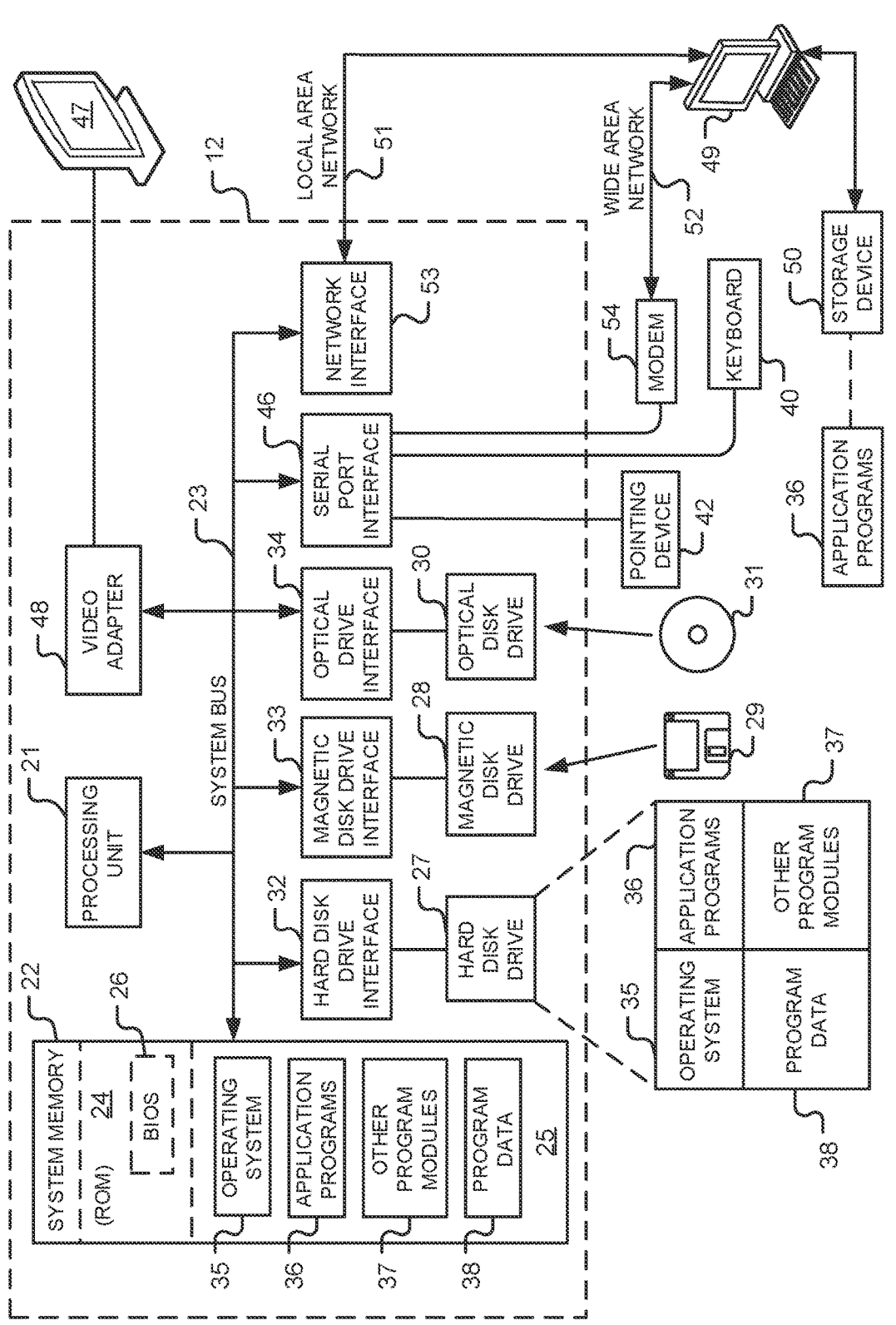
FIG. 9 is a diagram of a hardware environment and an operating environment in which a convention computer used to implement a host processor of the quantum computing system of FIG. 1A may be implemented.

FIG. 9 is a diagram of hardware and an operating environment in conjunction with which implementations of the conventional computer used to implement the host processor 166 (see FIG. 1A) may be practiced. The description of FIG. 9 is intended to provide a brief, general description of suitable computer hardware and a suitable computing environment in which implementations may be practiced. The methods 170, 180, 200, 300, 400, 670, and 680 (see FIGS. 4, 5, 6, 7, 8, 11, and 12, respectively) are described in the general context of computer-executable instructions, such as program modules, being executed by a computer. Generally, program modules include routines, programs, objects, components, data structures, etc., that perform particular tasks or implement particular abstract data types.

Moreover, those of ordinary skill in the art will appreciate that implementations may be practiced with other computer system configurations, including hand-held devices, multi-processor systems, microprocessor-based or programmable consumer electronics, network PCs, minicomputers, main-frame computers, and/or the like. Implementations may also be practiced in distributed computing environments (e.g., cloud computing platforms) where tasks are performed by remote processing devices that are linked through a communications network. In a distributed computing environment, program modules may be located in both local and remote memory storage devices.

The exemplary hardware and operating environment of FIG. 9 includes a general-purpose computing device in the form of the computing device 12. The computing device 12 may be a conventional computer, a personal computer, a distributed computer, or any other type of computer. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, and/or the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and/or the like.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those of ordinary skill in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and/or the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and/or the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feed back game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 9 include a local-area network (LAN) 51 and a wide-area network (WAN) 52. Such networking environments are commonplace in offices, enterprise-wide computer networks, intranets and the Internet.

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores machine or processor executable instructions that when executed by one or more processors cause the one or more processors to perform all or portions of one or more of the methods (including the methods 170, 180, 200, 300, 400, 670, and 680 illustrated in FIGS. 4, 5, 6, 7, 8, 11, and 12, respectively) described above. Such instructions may be stored on one or more non-transitory computer-readable media.

In some embodiments, the system memory 22 stores machine or processor executable instructions that when executed by one or more processors cause the one or more processors (e.g., the host processor 166 alone or with the control processor plane 164) to cause quantum hardware components (e.g., the quantum data plane 160 and/or the control and measurement plane 162) to construct at least a portion of at least one of the quantum circuits 700 and 800 illustrated in FIGS. 13 and 14, respectively) described above, and/or use at least a portion of at least one of the quantum circuits 700 and 800 to distill state as described herein. Such instructions may be stored on one or more non-transitory computer-readable media.

The following references are incorporated herein by reference in their entireties.

REFERENCES

[1] William Wesley Peterson, Wesley Peterson, E J Weldon, and E J Weldon. Error-correcting codes. MIT press, 1972.
[2] Sarah J Johnson. Iterative error correction: Turbo, low-density parity-check and repeat-accumulate codes. Cambridge university press, 2009.
[3] Loren Lugosch and Warren J Gross. Learning from the syndrome. In 2018 52nd Asilomar Conference on Signals, Systems, and Computers, pages 594-598. IEEE, 2018.
[4] Ye-Hua Liu and David Poulin. Neural belief-propagation decoders for quantum error-correcting codes. Physical review letters, 122(20):200501, 2019.
[5] Peter W Shor. Fault-tolerant quantum computation. In Proceedings of 37th Conference on Foundations of Computer Science, pages 56-65. IEEE, 1996.
[6] Andrew M Steane. Active stabilization, quantum computation, and quantum state synthesis. Physical Review Letters, 78(11):2252, 1997.
[7] Emanuel Knill. Fault-tolerant postselected quantum computation: Schemes. arXiv preprint quant-ph/0402171, 2004.
[8] Sergey Bravyi and Alexei Kitaev. Universal quantum computation with ideal clifford gates and noisy ancillas. Phys. Rev. A, 71:022316, February 2005.
[9] Ben Reichardt. Quantum universality from magic states distillation applied to css codes. Quantum Information Processing, 4(3):251-264, 2005.
[10] Campbell, Earl T., and Dan E. Browne. "On the structure of protocols for magic state distillation." In Workshop on Quantum Computation, Communication, and Cryptography, pp. 20-32. Springer, Berlin, Heidelberg, 2009.

At least one embodiment of the disclosure can be described in view of the following clauses:

1. A method for use with at least one quantum check operator and a parity-check code, the method comprising:
   using the at least one quantum check operator to couple quantum codewords with syndrome qubits;
   obtaining a specification based at least in part on the parity-check code;
   using the specification to couple the syndrome qubits with measure qubits; and
   measuring the measure qubits to determine whether any errors are present in the quantum codewords.

2. The method of clause 1, wherein the at least one quantum check operator is associated with a quantum error correcting code.

3. The method of clause 1 or 2, wherein the parity-check code is a classical error correcting code.

4. The method of any one of clauses 1-3, wherein the specification is obtained based at least in part on a binary matrix that is based at least in part on the parity-check code.

5. The method of any one of clauses 1-4, wherein the parity-check code comprises a parity-check matrix, and obtaining the specification comprises determining a Kronecker product of the parity-check matrix and an identity matrix.

6. The method of any one of clauses 1-5, further comprising:
   obtaining a logical parity syndrome by the measuring of the measure qubits; and determining the quantum codewords contain at least one error when the logical parity syndrome comprises a non-zero value.

7. The method of any one of clauses 1-6, further comprising:
   obtaining a logical parity syndrome by the measuring of the measure qubits; and determining the quantum codewords contain at least one error when the logical parity syndrome has a value of −1.

8. The method of any one of clauses 1-7 for use with the at least one quantum check operator comprising a plurality of quantum check operators, wherein the specification is obtained based at least in part on a first binary matrix that is based at least in part on the parity-check code, and the method further comprises: forming a second binary matrix comprising binary versions of the plurality of quantum check operators; and obtaining a logical parity configuration matrix by determining a Kronecker product of the first and second binary matrices.

9. The method of any one of clauses 1-8 for use with the at least one quantum check operator comprising one or more Pauli-X operators and one or more Pauli-Z operators, wherein the specification is obtained based at least in part on a first binary matrix that is based at least in part on the parity-check code, and the method further comprises:
   forming a second binary matrix comprising a first sub-matrix representing the one or more Pauli-X operators and a second sub-matrix representing the one or more Pauli-Z operators; and
   obtaining a logical parity configuration matrix based at least in part on a first Kronecker product of the first binary matrix and the first sub-matrix and a second Kronecker product of the first binary matrix and the second sub-matrix.

10. The method of any one of clauses 1-9, further comprising:
   using data qubits to create the quantum codewords; and
   applying at least one corrective action to any of the data qubits associated with an error when it is determined that one or more errors are present in the quantum codewords.

11. The method of any one of clauses 1-10, wherein the quantum codewords were created using data qubits, and the method further comprises:
   obtaining measurement outcomes based at least in part on the measuring of the measure qubits; and
   using the measurement outcomes to identify locations of any errors present in the data qubits.

12. The method of any one of clauses 1-11, wherein the at least one quantum check operator is used to couple the quantum codewords with the syndrome qubits after the specification is used to couple the syndrome qubits with the measure qubits.

13. The method of any one of clauses 1-12, further comprising:
   resetting the measure qubits to produce reset measure qubits; and using the specification to couple the syndrome qubits with the reset measure qubits.

14. The method of any one of clauses 1-13, wherein the at least one quantum check operator comprises at least one non-Calderbank-Shor-Steane ("CSS") quantum check operator.

15. A method for use with at least one quantum check operator and a parity-check code, the method comprising:
   using the at least one quantum check operator to couple at least one qubit with at least one syndrome qubit;
   obtaining a specification based at least in part on the parity-check code;
   using the specification to couple the at least one syndrome qubit with at least one measure qubit; and
   measuring the at least one measure qubit to determine whether any errors are present in at least one quantum state of the at least one qubit.

16. The method of clause 15, wherein the at least one qubit and the at least one syndrome qubit have noisy resource states.

17. The method of clause 15 or 16, wherein the at least one syndrome qubit comprises a plurality of syndrome qubits coupled to define at least one block of coupled syndrome qubits.

18. The method of any one of clauses 15-17, further comprising:
   discarding any of the at least one qubit having the at least one quantum state determined to include at least one error.

19. The method of any one of clauses 15-18, further comprising:
   obtaining a logical parity syndrome by the measuring the at least one measure qubit; and determining the at least one quantum state includes one or more errors when the logical parity syndrome comprises a non-zero value.

20. The method of any one of clauses 15-19, further comprising:
   joining any of the at least one quantum state determined not to include at least one error to produce at least one higher fidelity resource state.

21. The method of any one of clauses 15-20, wherein the at least one quantum check operator is associated with a quantum error correcting code.

22. The method of any one of clauses 15-21, wherein the parity-check code is a classical error correcting code.

23. The method of any one of clauses 15-22, wherein the specification is obtained based at least in part on a binary matrix that is based at least in part on the parity-check code.

24. The method of any one of clauses 15-23, wherein the parity-check code comprises a parity-check matrix, and obtaining the specification comprises determining a Kronecker product of the parity-check matrix and an identity matrix.

25. The method of any one of clauses 15-24, further comprising:

using the at least one quantum check operator to construct a first portion of a quantum circuit, the first portion to couple the at least one qubit with the at least one syndrome qubit; and using the specification to construct a second portion of the quantum circuit, the second portion to couple the at least one syndrome qubit with the at least one measure qubit.

26. The method of clause 25, wherein the quantum circuit comprises Pauli-X gates positioned between the first portion and the second portion.

27. The method of clause 25 or 26, wherein coupling the at least one qubit with the at least one syndrome qubit produces a plurality of coupled qubits comprising a plurality of distillation blocks each comprising multiple coupled qubits, and the method further comprises:

discarding one or more of the plurality of distillation blocks to leave at least one distillation block when an error is found in a quantum state of any of the multiple coupled qubits of the one or more distillation blocks;

constructing a new quantum circuit to couple the multiple coupled qubits of the at least one distillation block with multiple measure qubits; and measuring the multiple measure qubits to determine whether any errors are present in one or more states of the multiple coupled qubits of the at least one distillation block.

28. The method of clause 27, wherein the new quantum circuit is constructed based on a new specification that has a size based at least in part on a size of the at least one distillation block.

29. The method of clause 27 or 28, wherein the new quantum circuit is constructed based on a new specification, and the method further comprises:

obtaining the new specification based at least in part on the parity-check code.

30. The method of any one of clauses 15-29, wherein the at least one quantum check operator comprises at least one non-Calderbank-Shor-Steane ("CSS") quantum check operator.

31. A method of preparing a plurality of qubits having a target multiple-qubit entangled state, the method comprising: using at least one verification circuit to couple multiple qubits with at least one syndrome qubit, the at least one verification circuit being associated with a target multiple-qubit entangled state; using the at least one verification circuit to couple the at least one syndrome qubit with at least one measure qubit in accordance with a specification determined based at least in part on a parity-check matrix and an identity matrix; and measuring the at least one measure qubit to determine which of the multiple qubits have the target multiple-qubit entangled state.

32. The method of clause 31, further comprising:

discarding any of the multiple qubits which do not have the target multiple-qubit entangled state.

33. The method of clause 31 or 32, wherein one or more error free qubits of the multiple qubits are determined to have the target multiple-qubit entangled state, and the method further comprises:

using the one or more error free qubits as syndrome qubits.

34. A system comprising:

quantum hardware components;

one or more processors;

memory storing machine executable instructions that when executed by the one or more processors, cause the quantum hardware components to: construct at least one quantum circuit to couple quantum codewords with syndrome qubits based at least in part on at least one quantum check operator, and to couple the syndrome qubits with measure qubits based at least in part on a parity-check code; and measure the measure qubits to determine whether any errors are present in the quantum codewords.

35. The system of clause 34, wherein the at least one quantum check operator is associated with a quantum error correcting code.

36. The system of clause 34 or 35, wherein the parity-check code is a classical error correcting code.

37. The system of any one of clauses 34-36, wherein the machine executable instructions, when executed by the one or more processors, cause the system to: obtain a specification based at least in part on the parity-check code, wherein a portion of the at least one quantum circuit that is to couple the syndrome qubits with the measure qubits is constructed in accordance with the specification.

38. The system of clause 37, wherein the parity-check code comprises a parity-check matrix, and obtaining the specification comprises determining a Kronecker product of the parity-check matrix and an identity matrix.

39. The system of clause 37 or 38, for use with the at least one quantum check operator comprising a plurality of quantum check operators, wherein the specification is obtained based at least in part on a first binary matrix that is based at least in part on the parity-check code, and the machine executable instructions, when executed by the one or more processors, cause the one or more processors to: form a second binary matrix comprising binary versions of the plurality of quantum check operators; obtain a logical parity configuration matrix by determining a Kronecker product of the first and second binary matrices; and use the logical parity configuration matrix to infer whether any errors are present in the quantum codewords.

40. The system of any one of clauses 37-39 for use with the at least one quantum check operator comprising one or more Pauli-X operators and one or more Pauli-Z operators, wherein the specification is to be obtained based at least in part on a first binary matrix that is based at least in part on the parity-check code, and the machine executable instructions, when executed by the one or more processors, cause the one or more processors to: define a second binary matrix comprising a first sub-matrix representing the one or more Pauli-X operators and a second sub-matrix representing the one or more Pauli-Z operators; define a logical parity configuration matrix based at least in part on a first Kronecker product of the first binary matrix and the first sub-matrix and a second Kronecker product of the first binary matrix and the second sub-matrix; and use the logical parity configuration matrix to infer whether any errors are present in the quantum codewords.

41. The system of any one of clauses 34-40, wherein the machine executable instructions, when executed by the one or more processors, cause the quantum hardware components to: obtain a logical parity syndrome by the measuring of the measure qubits; and the machine executable instructions, when executed by the one or more processors, cause the one or more processors to determine the quantum codewords contain at least one error when the logical parity syndrome comprises a non-zero value.

42. The system of any one of clauses 34-41, wherein the machine executable instructions, when executed by the one or more processors, cause the quantum hardware components to: obtain a logical parity syndrome by the measuring of the measure qubits; and the machine executable instructions, when executed by the one or more processors, cause the one or more processors to determine the quantum codewords contain at least one error when the logical parity syndrome has a value of −1.

43. The system of any one of clauses 34-42, wherein the machine executable instructions, when executed by the one or more processors, cause the quantum hardware components to use data qubits to create the quantum codewords; and the machine executable instructions, when executed by the one or more processors, cause the one or more processors to apply at least one corrective action to any of the data qubits associated with an error when it is determined that one or more errors are present in the quantum codewords.

44. The system of any one of clauses 34-43, wherein the quantum codewords were created using data qubits, the machine executable instructions, when executed by the one or more processors, cause the quantum hardware components to obtain measurement outcomes based at least in part on the measuring of the measure qubits, and the machine executable instructions, when executed by the one or more processors, cause the one or more processors to use the measurement outcomes to identify locations of any errors present in the data qubits.

45. The system of any one of clauses 34-44, wherein the at least one quantum circuit is to couple the quantum codewords with the syndrome qubits after the at least one quantum circuit is to couple the syndrome qubits with the measure qubits.

46. The system of any one of clauses 34-45, wherein the machine executable instructions, when executed by the one or more processors, cause the quantum hardware components to: reset the measure qubits to produce reset measure qubits; and couple the syndrome qubits with the reset measure qubits.

47. The system of any one of clauses 34-46, wherein the at least one quantum check operator comprises at least one non-Calderbank-Shor-Steane ("CSS") quantum check operator.

48. A system comprising: quantum hardware components; one or more processors; memory storing machine executable instructions that when executed by the one or more processors, cause the quantum hardware components to: couple at least one qubit with at least one syndrome qubit based at least in part on at least one quantum check operator; couple the at least one syndrome qubit with at least one measure qubit based at least in part on a specification determined based at least in part on a parity-check code; and measure the at least one measure qubit to determine whether any errors are present in at least one quantum state of the at least one qubit.

49. The system of clause 48, wherein the at least one qubit and the at least one syndrome qubit have noisy resource states.

50. The system of clause 48 or 49, wherein the at least one syndrome qubit comprises a plurality of syndrome qubits coupled to define at least one block of coupled syndrome qubits.

51. The system of any one of clauses 48-50, wherein the machine executable instructions, when executed by the one or more processors, cause the quantum hardware components to: discard any of the at least one qubit having the at least one quantum state determined to include at least one error.

52. The system of any one of clauses 48-51, wherein the machine executable instructions, when executed by the one or more processors, cause the quantum hardware components to obtain a logical parity syndrome by the measuring the at least one measure qubit, and the machine executable instructions, when executed by the one or more processors, cause the one or more processors to determine the at least one quantum state includes one or more errors when the logical parity syndrome comprises a non-zero value.

53. The system of any one of clauses 48-52, wherein the machine executable instructions, when executed by the one or more processors, cause the quantum hardware components to join any of the at least one quantum state determined not to include at least one error to produce at least one higher fidelity resource state.

54. The system of any one of clauses 48-53, wherein the at least one quantum check operator is associated with a quantum error correcting code.

55. The system of any one of clauses 48-54, wherein the parity-check code is a classical error correcting code.

56. The system of any one of clauses 48-55, wherein the specification is obtained based at least in part on a binary matrix that is based at least in part on the parity-check code.

57. The system of any one of clauses 48-56, wherein the parity-check code comprises a parity-check matrix, and the machine executable instructions, when executed by the one or more processors, cause the one or more processors to obtain the specification by determining a Kronecker product of the parity-check matrix and an identity matrix.

58. The system of any one of clauses 48-57, wherein the machine executable instructions, when executed by the one or more processors, cause the quantum hardware components to: use the at least one quantum check operator to construct a first portion of a quantum circuit, the first portion to couple the at least one qubit with the at least one syndrome qubit; and use the specification to construct a second portion of the quantum circuit, the second portion to couple the at least one syndrome qubit with the at least one measure qubit.

59. The system of clause 58, wherein the quantum circuit comprises Pauli-X gates positioned between the first portion and the second portion.

60. The system of clause 58 or 59, wherein coupling the at least one qubit with the at least one syndrome qubit produces a plurality of coupled qubits comprising a plurality of distillation blocks each comprising multiple coupled qubits, and the machine executable instructions, when executed by the one or more processors, cause the quantum hardware components to: discard one or more of the plurality of distillation blocks to leave at least one distillation block when an error is found in a quantum state of any of the multiple coupled qubits of the one or more distillation blocks; construct a new quantum circuit to couple the multiple coupled qubits of the at least one distillation block with multiple measure qubits; and measure the multiple measure qubits to determine whether any errors are present in one or more states of the multiple coupled qubits of the at least one distillation block.

61. The system of clause 60, wherein the new quantum circuit is constructed based on a new specification that has a size based at least in part on a size of the at least one distillation block.

62. The system of clause 60 or 61, wherein the new quantum circuit is constructed based on a new specification, and the machine executable instructions, when executed by the one or more processors, cause the one or more processors to: obtain the new specification based at least in part on the parity-check code.

63. The system of any one of clauses 48-62, wherein the at least one quantum check operator comprises at least one non-Calderbank-Shor-Steane ("CSS") quantum check operator.

64. A system comprising: at least one verification circuit to couple multiple qubits with at least one syndrome qubit, and to couple the at least one syndrome qubit with at least one measure qubit in accordance with a specification determined based at least in part on a parity-check matrix and an identity matrix, the at least one verification circuit to be associated with a target multiple-qubit entangled state; and a quantum decoder hardware component to measure the at least one measure qubit to determine which of the multiple qubits have the target multiple-qubit entangled state.

65. The system of clause 64, wherein the quantum decoder hardware component is to discard any of the multiple qubits which do not have the target multiple-qubit entangled state.

66. The system of clause 64 or 65, wherein one or more error free qubits of the multiple qubits are determined to have the target multiple-qubit entangled state, and the system further comprises: digital hardware components to cause the at least one verification circuit to use the one or more error free qubits as syndrome qubits.

67. A method comprising: coupling a plurality of codewords to one or more ancilla qubits based at least in part on a binary matrix associated with one or more non-Calderbank-Shor-Steane ("non-CSS") quantum codes; and using the one or more ancilla qubits to obtain information about any errors present in the plurality of codewords.

68. The method of clause 67, wherein coupling the plurality of codewords to the one or more ancilla qubits comprises: calculating a specification based at least in part on the binary matrix and one or more non-CSS quantum check operators associated with the one or more non-CSS quantum codes, and using the specification to construct a quantum circuit to couple the plurality of codewords to the one or more ancilla qubits.

69. The method of clause 67 or 68, wherein coupling the plurality of codewords to the one or more ancilla qubits comprises constructing a quantum circuit that is to couple the plurality of codewords to the one or more ancilla qubits.

70. The method of any one of clauses 67-69, further comprising:
  encoding a plurality of data qubits using the one or more non-CSS quantum codes to obtain the plurality of codewords.

71. The method of any one of clauses 67-70, further comprising:
  performing quantum logic gates on logical qubits contained in the plurality of codewords before coupling the plurality of codewords to the one or more ancilla qubits.

72. The method of any one of clauses 67-71, wherein using the one or more ancilla qubits to obtain the information about any errors present in the plurality of codewords comprises: measuring the one or more ancilla qubits to obtain one or more measurement outcomes; and using the one or more measurement outcomes to infer a location of each of any errors in the plurality of codewords.

73. The method of any one of clauses 67-72, wherein using the one or more ancilla qubits to obtain the information about any errors present in the plurality of codewords comprises: measuring the one or more ancilla qubits to obtain one or more measurement outcomes; and using the one or more measurement outcomes to infer a type of each of any errors in the plurality of codewords.

74. The method of any one of clauses 67-73, further comprising:
  performing one or more corrective actions with respect to any errors present in the plurality of codewords.

75. The method of any one of clauses 67-74, further comprising:
  calculating a specification based at least in part on the binary matrix that is based at least in part on a parity-check code, wherein the specification is used to couple the plurality of codewords to the one or more ancilla qubits.

76. A system comprising:
  at least one quantum circuit to couple a plurality of codewords to one or more ancilla qubits, the at least one quantum circuit to be generated based at least in part on a binary matrix associated with one or more non-Calderbank-Shor-Steane ("non-CSS") quantum codes; and
  at least one quantum hardware component to use the one or more ancilla qubits to obtain information about any errors present in the plurality of codewords.

77. The system of clause 76, further comprising digital hardware components to: calculate a specification based at least in part on the binary matrix and one or more non-CSS quantum check operators associated with the one or more non-CSS quantum codes, and cause one or more quantum hardware components to generate the at least one quantum circuit based at least in part on the specification.

78. The system of clause 76 or 77, further comprising:
  one or more quantum hardware components to encode a plurality of data qubits based at least in part on the one or more non-CSS quantum codes to obtain the plurality of codewords.

79. The system of any one of clauses 76-78, further comprising:
  quantum logic gates to be performed on logical qubits contained in the plurality of codewords before the plurality of codewords are to be coupled to the one or more ancilla qubits.

80. The system of any one of clauses 76-79, wherein the at least one quantum hardware component is to measure the one or more ancilla qubits to obtain one or more measurement outcomes, and the system further comprises: digital hardware components to use the one or more measurement outcomes to infer a location of each of any errors in the plurality of codewords.

81. The system of any one of clauses 76-80, wherein the at least one quantum hardware component is to measure the one or more ancilla qubits to obtain one or more measurement outcomes, and the system further comprises:

digital hardware components to use the one or more measurement outcomes to infer a type of each of any errors in the plurality of codewords.

82. The system of any one of clauses 76-81, further comprising:

digital hardware components to cause one or more corrective actions to be performed with respect to any errors present in the plurality of codewords.

83. The system of any one of clauses 76-82, further comprising digital hardware components to:

calculate a specification based at least in part on the binary matrix, which is based at least in part on a parity-check code, and cause one or more quantum hardware components to generate the at least one quantum circuit based at least in part on the specification.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. A method for use with at least one quantum check operator and a parity-check code, the method comprising:

using the at least one quantum check operator to couple quantum codewords with syndrome qubits;

obtaining a specification based at least in part on the parity-check code;

using a logical syndrome compressor of a quantum apparatus to couple the syndrome qubits with measure qubits using the specification; and measuring the measure qubits to determine whether any errors are present in the quantum codewords.

2. The method of claim 1, wherein the at least one quantum check operator is associated with a quantum error correcting code.

3. The method of claim 1, wherein the parity-check code is a classical error correcting code.

4. The method of claim 1, wherein the specification is obtained based at least in part on a binary matrix that is based at least in part on the parity-check code.

5. The method of claim 1, wherein the parity-check code comprises a parity-check matrix, and obtaining the specification comprises determining a Kronecker product of the parity-check matrix and an identity matrix.

6. The method of claim 1, further comprising:

obtaining a logical parity syndrome by the measuring of the measure qubits; and determining the quantum codewords contain at least one error when the logical parity syndrome comprises a non-zero value.

7. The method of claim 1, further comprising:
obtaining a logical parity syndrome by the measuring of the measure qubits; and
determining the quantum codewords contain at least one error when the logical parity syndrome has a value of −1.

8. The method of claim 1 for use with the at least one quantum check operator comprising a plurality of quantum check operators, wherein the specification is obtained based at least in part on a first binary matrix that is based at least in part on the parity-check code, and the method further comprises:
forming a second binary matrix comprising binary versions of the plurality of quantum check operators; and
obtaining a logical parity configuration matrix by determining a Kronecker product of the first and second binary matrices.

9. The method of claim 1 for use with the at least one quantum check operator comprising one or more Pauli-X operators and one or more Pauli-Z operators, wherein the specification is obtained based at least in part on a first binary matrix that is based at least in part on the parity-check code, and the method further comprises:
forming a second binary matrix comprising a first sub-matrix representing the one or more Pauli-X operators and a second sub-matrix representing the one or more Pauli-Z operators; and
obtaining a logical parity configuration matrix based at least in part on a first Kronecker product of the first binary matrix and the first sub-matrix and a second Kronecker product of the first binary matrix and the second sub-matrix.

10. The method of claim 1, further comprising:
using data qubits to create the quantum codewords; and
applying at least one corrective action to any of the data qubits associated with an error when it is determined that one or more errors are present in the quantum codewords.

11. The method of claim 1, wherein the quantum codewords were created using data qubits, and the method further comprises:
obtaining measurement outcomes based at least in part on the measuring of the measure qubits; and
using the measurement outcomes to identify locations of any errors present in the data qubits.

12. The method of claim 1, wherein the at least one quantum check operator is used to couple the quantum codewords with the syndrome qubits after the specification is used to couple the syndrome qubits with the measure qubits.

13. The method of claim 1, further comprising:
resetting the measure qubits to produce reset measure qubits; and
using the specification to couple the syndrome qubits with the reset measure qubits.

14. The method of claim 1, wherein the at least one quantum check operator comprises at least one non-Calderbank-Shor-Steane ("CSS") quantum check operator.

15. The method of claim 1, wherein the measure qubits are measured after being coupled with the syndrome qubits.

16. A method for use with at least one quantum check operator and a parity-check code, the method comprising:
using the at least one quantum check operator to couple at least one qubit with at least one syndrome qubit;

obtaining a specification based at least in part on the parity-check code;
using a hardware component of a quantum apparatus to couple the at least one syndrome qubit with at least one measure qubit using the specification; and
measuring the at least one measure qubit to determine whether any errors are present in at least one quantum state of the at least one qubit.

17. The method of claim 16, wherein the at least one qubit and the at least one syndrome qubit have noisy resource states.

18. The method of claim 16, wherein the at least one syndrome qubit comprises a plurality of syndrome qubits coupled to define at least one block of coupled syndrome qubits.

19. The method of claim 16, further comprising:
discarding any of the at least one qubit having the at least one quantum state determined to include at least one error.

20. The method of claim 16, further comprising:
obtaining a logical parity syndrome by the measuring the at least one measure qubit; and
determining the at least one quantum state includes one or more errors when the logical parity syndrome comprises a non-zero value.

21. The method of claim 16, further comprising:
joining any of the at least one quantum state determined not to include at least one error to produce at least one higher fidelity resource state.

22. The method of claim 16, wherein the at least one quantum check operator is associated with a quantum error correcting code.

23. The method of claim 16, wherein the parity-check code is a classical error correcting code.

24. The method of claim 16, wherein the specification is obtained based at least in part on a binary matrix that is based at least in part on the parity-check code.

25. The method of claim 16, wherein the parity-check code comprises a parity-check matrix, and
obtaining the specification comprises determining a Kronecker product of the parity-check matrix and an identity matrix.

26. The method of claim 16, further comprising:
using the at least one quantum check operator to construct a first portion of a quantum circuit, the first portion to couple the at least one qubit with the at least one syndrome qubit; and
using the specification to construct a second portion of the quantum circuit, the second portion to couple the at least one syndrome qubit with the at least one measure qubit.

27. The method of claim 26, wherein the quantum circuit comprises Pauli-X gates positioned between the first portion and the second portion.

28. The method of claim 26, wherein coupling the at least one qubit with the at least one syndrome qubit produces a plurality of coupled qubits comprising a plurality of distillation blocks each comprising multiple coupled qubits, and the method further comprises:
discarding one or more of the plurality of distillation blocks to leave at least one distillation block when an error is found in a quantum state of any of the multiple coupled qubits of the one or more distillation blocks;
constructing a new quantum circuit to couple the multiple coupled qubits of the at least one distillation block with multiple measure qubits; and measuring the multiple measure qubits to determine whether any errors are present in one or more states of the multiple coupled qubits of the at least one distillation block.

29. The method of claim 28, wherein the new quantum circuit is constructed based on a new specification that has a size based at least in part on a size of the at least one distillation block.

30. The method of claim 28, wherein the new quantum circuit is constructed based on a new specification, and the method further comprises:

obtaining the new specification based at least in part on the parity-check code.

31. The method of claim 16, wherein the at least one quantum check operator comprises at least one non-Calderbank-Shor-Steane ("CSS") quantum check operator.

32. The method of claim 16, wherein the at least one measure qubit is measured after being coupled with the at least one syndrome qubit.

33. The method of claim 16, wherein the hardware component is a logical syndrome compressor.

34. A method of preparing a plurality of qubits having a target multiple-qubit entangled state, the method comprising:

using at least one verification circuit of a quantum apparatus to couple multiple qubits with at least one syndrome qubit, the at least one verification circuit being associated with a target multiple-qubit entangled state;

using a hardware component of the at least one verification circuit to couple the at least one syndrome qubit with at least one measure qubit in accordance with a specification determined based at least in part on a parity-check matrix and an identity matrix; and measuring the at least one measure qubit to determine which of the multiple qubits have the target multiple-qubit entangled state.

35. The method of claim 34, further comprising:

discarding any of the multiple qubits which do not have the target multiple-qubit entangled state.

36. The method of claim 34, wherein one or more error free qubits of the multiple qubits are determined to have the target multiple-qubit entangled state, and the method further comprises:

using the one or more error free qubits as syndrome qubits.

37. The method of claim 34, wherein the at least one measure qubit is measured after being coupled with the at least one syndrome qubit.

38. The method of claim 34, wherein the hardware component is a logical syndrome compressor.

39. A quantum device for use with at least one quantum check operator and a parity-check code, the quantum device comprising:

a quantum syndrome extractor to use the at least one quantum check operator to couple quantum codewords with syndrome qubits;

a logical syndrome compressor to use a specification based at least in part on the parity-check code to couple the syndrome qubits with measure qubits; and a measurement apparatus to measure the measure qubits to detect whether any errors are present in the quantum codewords.

40. The quantum device of claim 39, wherein the measure qubits are measured by the measurement apparatus after having been coupled with the syndrome qubits.

41. The quantum device of claim 39, wherein the logical syndrome compressor is to generate the specification based at least in part on the parity-check code.

42. The quantum device of claim 39, further comprising:

a logical parity decoder to use results obtained by the measurement apparatus to determine where any errors detected by the measurement apparatus occurred in the quantum codewords.

\* \* \* \* \*